United States Patent
Chu et al.

(10) Patent No.: US 10,702,819 B2
(45) Date of Patent: Jul. 7, 2020

(54) AIR CLEANER

(71) Applicant: SAMSUNG ELECTRONICS CO., LTD., Suwon-si, Gyeonggi-do (KR)

(72) Inventors: Euy Sung Chu, Suwon-si (KR); Nak Hyun Kim, Yongin-si (KR); Ju Young Kim, Suwon-si (KR); Jee Ho Park, Suwon-si (KR); Moon Sun Shin, Yongin-si (KR); Sang Ho Shin, Suwon-si (KR); Seung Won Oh, Seongnam-si (KR); Jeong Kyo Oh, Suwon-si (KR); Jun Hwa Lee, Suwon-si (KR); Tae Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 15/950,595

(22) Filed: Apr. 11, 2018

(65) Prior Publication Data
US 2019/0160411 A1 May 30, 2019

(30) Foreign Application Priority Data

Nov. 27, 2017 (KR) .................. 10-2017-0159175

(51) Int. Cl.
*B01D 46/00* (2006.01)
*H01R 13/24* (2006.01)
(Continued)

(52) U.S. Cl.
CPC ....... *B01D 46/0013* (2013.01); *B01D 46/002* (2013.01); *B01D 46/0019* (2013.01); *F16D 1/10* (2013.01); *H01R 13/2421* (2013.01); *H01R 13/6276* (2013.01); *B01D 2267/60* (2013.01); *B01D 2279/40* (2013.01); *H01R 39/64* (2013.01)

(58) Field of Classification Search
CPC ............ B01D 46/0002; B01D 46/0013; B01D 46/0019
See application file for complete search history.

(56) References Cited

U.S. PATENT DOCUMENTS

| 10,322,811 B2 * | 6/2019 | Breigenzer ............... A61L 9/20 |
| 2007/0131114 A1 | 6/2007 | Lanker et al. |

FOREIGN PATENT DOCUMENTS

| JP | 2012-149879 | 8/2012 |
| KR | 20-0378995 | 3/2005 |

(Continued)

OTHER PUBLICATIONS

International Search Report dated Sep. 18, 2018 from International Patent Application No. PCT/KR2018/004283, 5 pages.

*Primary Examiner* — Robert A Hopkins
(74) *Attorney, Agent, or Firm* — Staas & Halsey LLP

(57) ABSTRACT

Disclosed herein is an air cleaner capable of being coupled or separated in a vertical direction to improve space utilization. An air cleaner may include a first air cleaning module provided with a first connection unit, and a second air cleaning module detachably coupled to the first air cleaning module and provided with a second connection unit, wherein the second connection unit is configured to be detachably coupled to the first connection unit, and configured to be rotatable with respect to the first connection unit when the second connection unit is coupled to the first connection unit.

19 Claims, 29 Drawing Sheets

(51) Int. Cl.
*H01R 13/627* (2006.01)
*F16D 1/10* (2006.01)
*H01R 39/64* (2006.01)

(56) References Cited

FOREIGN PATENT DOCUMENTS

| | | |
|---|---|---|
| KR | 10-0507996 | 8/2005 |
| KR | 10-2006-0026319 | 3/2006 |
| KR | 10-2008-0043761 | 5/2008 |
| KR | 10-2008-0114258 | 12/2008 |
| KR | 10-0876983 | 12/2008 |
| KR | 10-2009-0017180 | 2/2009 |
| KR | 10-2009-0017319 | 2/2009 |
| KR | 10-2009-0017326 | 2/2009 |
| KR | 10-2009-0029219 | 3/2009 |
| KR | 10-0891128 | 3/2009 |
| KR | 10-0891621 | 3/2009 |
| KR | 10-2009-0035990 | 4/2009 |
| KR | 10-2009-0040650 | 4/2009 |
| KR | 10-0901300 | 6/2009 |
| KR | 10-2009-0084442 | 8/2009 |
| KR | 10-2009-0104387 | 10/2009 |
| KR | 10-2009-0111083 | 10/2009 |
| KR | 10-2009-0112211 | 10/2009 |
| KR | 10-2009-0125989 | 12/2009 |
| KR | 10-2009-0127205 | 12/2009 |
| KR | 10-2010-0001012 | 1/2010 |
| KR | 10-0937105 | 1/2010 |
| KR | 10-0942272 | 2/2010 |
| KR | 10-0946106 | 2/2010 |
| KR | 10-0950713 | 3/2010 |
| KR | 10-0953433 | 4/2010 |
| KR | 10-2010-0053091 | 5/2010 |
| KR | 10-2010-0058107 | 6/2010 |
| KR | 10-2010-0060045 | 6/2010 |
| KR | 10-2010-0061231 | 6/2010 |
| KR | 10-2010-0069918 | 6/2010 |
| KR | 10-2010-0073215 | 7/2010 |
| KR | 10-2010-0073782 | 7/2010 |
| KR | 10-2010-0082995 | 7/2010 |
| KR | 10-0976169 | 8/2010 |
| KR | 10-2010-0105958 | 10/2010 |
| KR | 10-2012-0123622 | 11/2010 |
| KR | 10-1016342 | 2/2011 |
| KR | 10-2011-0023296 | 3/2011 |
| KR | 10-2011-0023976 | 3/2011 |
| KR | 10-2011-0024656 | 3/2011 |
| KR | 10-2011-0048480 | 5/2011 |
| KR | 10-1037798 | 5/2011 |
| KR | 10-2011-0083389 | 7/2011 |
| KR | 10-2011-0090321 | 8/2011 |
| KR | 10-2011-0098248 | 9/2011 |
| KR | 10-2011-0100088 | 9/2011 |
| KR | 10-2011-0101284 | 9/2011 |
| KR | 10-2011-0105207 | 9/2011 |
| KR | 10-2011-0105922 | 9/2011 |
| KR | 10-2011-0111513 | 10/2011 |
| KR | 10-2011-0113527 | 10/2011 |
| KR | 10-2011-0119320 | 11/2011 |
| KR | 10-2011-0139063 | 12/2011 |
| KR | 10-2012-0001560 | 1/2012 |
| KR | 10-2012-0003307 | 1/2012 |
| KR | 10-2012-0015372 | 2/2012 |
| KR | 10-2012-0016454 | 2/2012 |
| KR | 10-2012-0020026 | 3/2012 |
| KR | 10-2012-0025249 | 3/2012 |
| KR | 10-2012-0030358 | 3/2012 |
| KR | 10-2012-0051893 | 5/2012 |
| KR | 10-2012-0054634 | 5/2012 |
| KR | 10-2012-0056013 | 6/2012 |
| KR | 10-2012-0064190 | 6/2012 |
| KR | 10-1154492 | 6/2012 |
| KR | 10-1155173 | 6/2012 |
| KR | 10-1155269 | 6/2012 |
| KR | 10-2012-0073378 | 7/2012 |
| KR | 10-2012-0103845 | 9/2012 |
| KR | 10-2012-0110752 | 10/2012 |
| KR | 10-2012-0125593 | 11/2012 |
| KR | 10-2012-0133302 | 12/2012 |
| KR | 10-1214892 | 12/2012 |
| KR | 10-2013-0007866 | 1/2013 |
| KR | 10-2013-0015834 | 2/2013 |
| KR | 10-2013-0024621 | 3/2013 |
| KR | 10-2013-0025449 | 3/2013 |
| KR | 10-1246722 | 3/2013 |
| KR | 10-2013-0040313 | 4/2013 |
| KR | 10-2013-0041397 | 4/2013 |
| KR | 10-2013-0083230 | 7/2013 |
| KR | 10-2013-0084522 | 7/2013 |
| KR | 10-2013-0087655 | 8/2013 |
| KR | 10-2013-0090948 | 8/2013 |
| KR | 10-2013-0092759 | 8/2013 |
| KR | 10-2013-0094340 | 8/2013 |
| KR | 10-2013-0098556 | 9/2013 |
| KR | 10-2013-0102179 | 9/2013 |
| KR | 10-2013-0104641 | 9/2013 |
| KR | 10-2013-0104741 | 9/2013 |
| KR | 10-2013-0105963 | 9/2013 |
| KR | 10-1318261 | 10/2013 |
| KR | 10-1322978 | 10/2013 |
| KR | 10-1324095 | 10/2013 |
| KR | 10-1332199 | 11/2013 |
| KR | 10-2013-0142451 | 12/2013 |
| KR | 10-2014-0002377 | 1/2014 |
| KR | 10-2014-0023238 | 2/2014 |
| KR | 10-2014-0023242 | 2/2014 |
| KR | 10-1366061 | 2/2014 |
| KR | 10-2014-0029661 | 3/2014 |
| KR | 10-2014-0048151 | 4/2014 |
| KR | 10-1386401 | 4/2014 |
| KR | 10-1386404 | 4/2014 |
| KR | 10-2014-0054893 | 5/2014 |
| KR | 10-2014-0067214 | 6/2014 |
| KR | 10-2014-0071153 | 6/2014 |
| KR | 10-1406023 | 6/2014 |
| KR | 10-1407497 | 6/2014 |
| KR | 10-2014-0080692 | 7/2014 |
| KR | 10-2014-0099612 | 8/2014 |
| KR | 10-1438722 | 9/2014 |
| KR | 10-2014-0131736 | 11/2014 |
| KR | 10-1459619 | 11/2014 |
| KR | 10-1465643 | 11/2014 |
| KR | 10-2014-0144685 | 12/2014 |
| KR | 10-1479251 | 12/2014 |
| KR | 10-1491317 | 2/2015 |
| KR | 10-2015-0024193 | 3/2015 |
| KR | 10-2015-0030843 | 3/2015 |
| KR | 10-1501697 | 3/2015 |
| KR | 10-2015-0034803 | 4/2015 |
| KR | 10-2015-0041587 | 4/2015 |
| KR | 10-2015-0044171 | 4/2015 |
| KR | 10-1515786 | 4/2015 |
| KR | 10-2015-0050717 | 5/2015 |
| KR | 10-2015-0058216 | 5/2015 |
| KR | 10-2015-0059704 | 6/2015 |
| KR | 10-2015-0067572 | 6/2015 |
| KR | 10-2015-0068792 | 6/2015 |
| KR | 10-2015-0096268 | 8/2015 |
| KR | 10-2015-0106762 | 9/2015 |
| KR | 10-2015-0112698 | 10/2015 |
| KR | 10-2015-0112700 | 10/2015 |
| KR | 10-2015-0117579 | 10/2015 |
| KR | 10-1560254 | 10/2015 |
| KR | 10-2015-0123037 | 11/2015 |
| KR | 10-2015-0124646 | 11/2015 |
| KR | 10-2015-0128447 | 11/2015 |
| KR | 10-2015-0139228 | 12/2015 |
| KR | 10-2015-0140987 | 12/2015 |
| KR | 10-2016-0006148 | 1/2016 |
| KR | 10-2016-0006630 | 1/2016 |
| KR | 10-2016-0009989 | 1/2016 |
| KR | 10-1588849 | 1/2016 |
| KR | 10-2016-0011465 | 2/2016 |
| KR | 10-2016-0011469 | 2/2016 |

(56) References Cited

FOREIGN PATENT DOCUMENTS

| | | |
|---|---|---|
| KR | 10-2016-0012653 | 2/2016 |
| KR | 10-2016-0014336 | 2/2016 |
| KR | 10-2016-0019050 | 2/2016 |
| KR | 10-2016-0021681 | 2/2016 |
| KR | 10-1600623 | 2/2016 |
| KR | 10-2016-0027900 | 3/2016 |
| KR | 10-2016-035943 | 4/2016 |
| KR | 10-2016-0039137 | 4/2016 |
| KR | 10-1610744 | 4/2016 |
| KR | 10-2016-0054879 | 5/2016 |
| KR | 10-2016-0061063 | 5/2016 |
| KR | 10-1624929 | 5/2016 |
| KR | 10-2016-0062743 | 6/2016 |
| KR | 10-2016-0080247 | 7/2016 |
| KR | 10-2016-0109916 | 9/2016 |
| KR | 10-2016-0129333 | 11/2016 |
| KR | 10-2016-0144675 | 12/2016 |
| KR | 10-2016-0147301 | 12/2016 |
| KR | 10-1686650 | 12/2016 |
| KR | 10-2017-0000790 | 1/2017 |
| KR | 10-2017-0007003 | 1/2017 |
| KR | 10-1698045 | 1/2017 |
| KR | 10-2017-0023757 | 3/2017 |
| KR | 10-2017-0029147 | 3/2017 |
| KR | 10-2017-0038956 | 4/2017 |
| KR | 10-2017-0039019 | 4/2017 |
| KR | 10-2017-0040255 | 4/2017 |
| KR | 10-2017-0042116 | 4/2017 |
| KR | 10-2017-0042141 | 4/2017 |
| KR | 10-1725774 | 4/2017 |
| KR | 10-1732009 | 4/2017 |
| KR | 10-1732436 | 4/2017 |
| KR | 10-2017-0051104 | 5/2017 |
| KR | 10-2017-0051105 | 5/2017 |
| KR | 10-2017-0051108 | 5/2017 |
| KR | 10-2017-0051142 | 5/2017 |
| KR | 10-2017-0051183 | 5/2017 |
| KR | 10-2017-0051200 | 5/2017 |
| KR | 10-2017-0051201 | 5/2017 |
| KR | 10-2017-0051209 | 5/2017 |
| KR | 10-2017-0051211 | 5/2017 |
| KR | 10-2017-0051229 | 5/2017 |
| KR | 10-2017-0051230 | 5/2017 |
| KR | 10-2017-0051234 | 5/2017 |
| KR | 10-2017-0051236 | 5/2017 |
| KR | 10-2017-0051248 | 5/2017 |
| KR | 10-2017-0051265 | 5/2017 |
| KR | 10-1742750 | 5/2017 |
| KR | 10-2017-0068913 | 6/2017 |
| KR | 10-2017-0069674 | 6/2017 |
| KR | 10-2017-0074558 | 6/2017 |
| KR | 10-1745712 | 6/2017 |
| KR | 10-2017-0076254 | 7/2017 |
| KR | 10-2017-0079653 | 7/2017 |
| KR | 10-2017-0084390 | 7/2017 |
| WO | 2017/146352 | 8/2017 |

* cited by examiner

AIR CLEANER

CROSS-REFERENCE TO RELATED APPLICATION

This application is based on and claims priority under 35 U.S.C. § 119 to Korean Patent Application No. 10-2017-0159175, filed on Nov. 27, 2017 in the Korean Intellectual Property Office, the disclosure of which is incorporated by reference herein in its entirety.

BACKGROUND

1. Field

Embodiments of the present disclosure relate to an air cleaner, more particularly, to an air cleaner capable of being coupled and separated.

2. Description of Related Art

Air cleaners are apparatuses configured to remove pollutants from the air. The air cleaner can be used to remove bacteria, virus, mold, fine dust contained in the air and chemical material that causes odor.

The air cleaner may be provided with a filter for purifying contaminated indoor air. While the air sucked into the air cleaner passes through the filter, the pollutants in the air are removed and the air is cleaned. The purified air can be discharged to the outside of the air cleaner.

The air cleaner may be used in a variety of indoor spaces. The indoor space may be relatively wide or narrow. Accordingly, air cleaners with various capacities are available, and thus a user can purchase an air cleaner having a capacity suitable for him/her by considering a residential indoor space.

However, as for a residential space having a small indoor space and a large indoor space, it may be difficult to satisfy the user's needs with a single air cleaner having a small capacity or a large capacity. Although it is possible to consider providing a plurality of small-capacity air cleaners, when using a plurality of air cleaners in a single large indoor space, an area occupied by the air cleaners is too large. When a large-capacity air cleaner is provided, it may be impossible to simultaneously purify air in the small indoor space and the large indoor space.

SUMMARY

Therefore, it is an aspect of the present disclosure to provide an air cleaner, when the air cleaner is provided in plurality, capable of being coupled to be operated integrally or capable of being separated to be operated independently.

It is another aspect of the present disclosure to provide an air cleaner capable of being coupled or separated, wherein the air cleaner is capable of rotating in a coupled state.

It is another aspect of the present disclosure to provide an air cleaner capable of adjusting a capacity by being coupled or separated It is another aspect of the present disclosure to provide an air cleaner capable of having improved space utilization since a floor area occupied by a plurality of air cleaners is not increased although a capacity of the plurality of air cleaners is increased by coupling the plurality of air cleaners to each other.

Additional aspects of the present disclosure will be set forth in part in the description which follows and, in part, will be obvious from the description, or may be learned by practice of the present disclosure.

In accordance with one aspect of the present disclosure, an air cleaner may include a first air cleaning module provided with a first connection unit, and a second air cleaning module detachably coupled to the first air cleaning module and provided with a second connection unit, wherein the second connection unit is configured to be detachably coupled to the first connection unit, and configured to be rotatable with respect to the first connection unit when the second connection unit is coupled to the first connection unit.

The first connection unit may be disposed inside of the first air cleaning module when the first connection unit is separated from the second connection unit, and the first connection unit may protrude out of the first air cleaning module when the first connection unit is coupled to the second connection unit.

The first connection unit may be disposed on an upper surface of the first air cleaning module and the second connection unit may be disposed on a lower surface of the second air cleaning module.

The first connection unit may include a first housing coupled to a body and a first power connection portion disposed inside of the first housing.

The second connection unit may include a second housing provided with a plurality of through holes, a plurality of balls movably coupled to the plurality of through holes, a second power connection portion configured to be electrically connected to the first power connection portion by being coupled to the first power connection portion, and an elastic member configured to provide the elastic force to the plurality of balls.

The plurality of balls may be movable in a certain distance range in a radially outward direction of the second housing or in a radially inward direction of the second housing, and the elastic member provides the elastic force to move the plurality of balls in the radially outward direction.

The second connection unit may further include an elastic force transmitting member configured to transmit the elastic force from the elastic member to the plurality of balls and configured to be movable in a vertical direction, and a stopper fixed to the inside of the second housing to limit the downward movement of the elastic force transmitting member.

The elastic force transmitting member may be provided in a ring shape, wherein a lower surface of thereof is upwardly inclined toward the radially outer side, and the first housing may be formed such that an inner surface thereof is upwardly inclined toward the radially inner side.

The first connection unit may be rotatable with respect to a rotary shaft disposed in parallel to a first surface.

The first connection unit may include a gear housing provided with an inner gear portion provided in an inner circumferential surface of the gear housing, an upper gear configured to be movable in the vertical direction by being engaged with the inner gear portion, a first power connection portion coupled to an upper portion of the upper gear, a lower gear configured to be selectively engaged with the inner gear portion and disposed in the lower side of the upper gear, and an elastic member configured to elastically bias the lower gear upward.

The second connection unit may include a second power connection portion coupled to the lower surface of the body, the second power connection portion detachably coupled to the first power connection portion, and the second power connection portion configured to be rotatable in a state of being coupled to the first power connection portion.

The lower gear may be rotatable inside of the gear housing when the lower gear moves downward by equal to or more than a certain distance with respect to the gear housing.

The lower gear may include a first protrusion and a second protrusion configured to protrude to the radially outer side of the lower gear, wherein the second protrusion protrudes greater than the first protrusion, and the first protrusion and the second protrusion are alternately disposed along the circumferential direction of the lower gear.

When the lower gear is rotated inside of the gear housing, the lower gear may be selectively engaged with the inner gear portion.

When the lower gear is engaged with the inner gear portion, the lower gear may be moved upward.

When the lower gear is not engaged with the inner gear portion, the upward movement of the lower gear may be limited.

The first connection unit may include a first case provided with a first locking portion, a first power connection portion movably coupled to the first case in the vertical direction, and provided with a second locking portion selectively locked to the first locking portion, and an elastic member configured to provide the elastic force to move the first power connection portion upward.

The second connection unit may include a lever coupling portion provided with a first guide hole, a lever coupled to the lever coupling portion, a second case provided with a second guide hole such that the second guide hole and the first guide hole are arranged above and below each other, and a second power connection portion coupled to penetrate the first guide hole and the second guide hole.

When the lever is rotated, the second power connection portion may be moved back and forth, and as the second power connection portion is moved back and forth, the second power connection portion may be selectively connected or disconnected to the first power connection portion.

The second power connection portion may be provided in pairs, wherein as the pair of the second power connection portion move back and forth, a distance between the pair of the second power connection portion may be increased or reduced.

When a force greater than the elastic force of the elastic member is applied to the first power connection portion downward, the first power connection portion may be retracted into the inside of the body or pulled out from the inside of the body.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
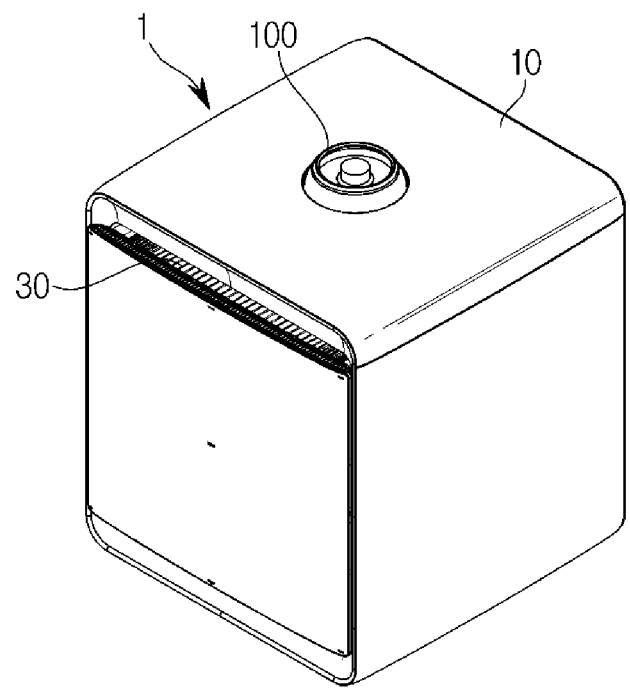
FIG. 1 is a view illustrating an air cleaning module according to an embodiment, particularly a state in which a first air cleaning module and a second air cleaning module are separated.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Hereinafter, embodiments according to the present disclosure will be described in detail with reference to the accompanying drawings.

Figure 2:
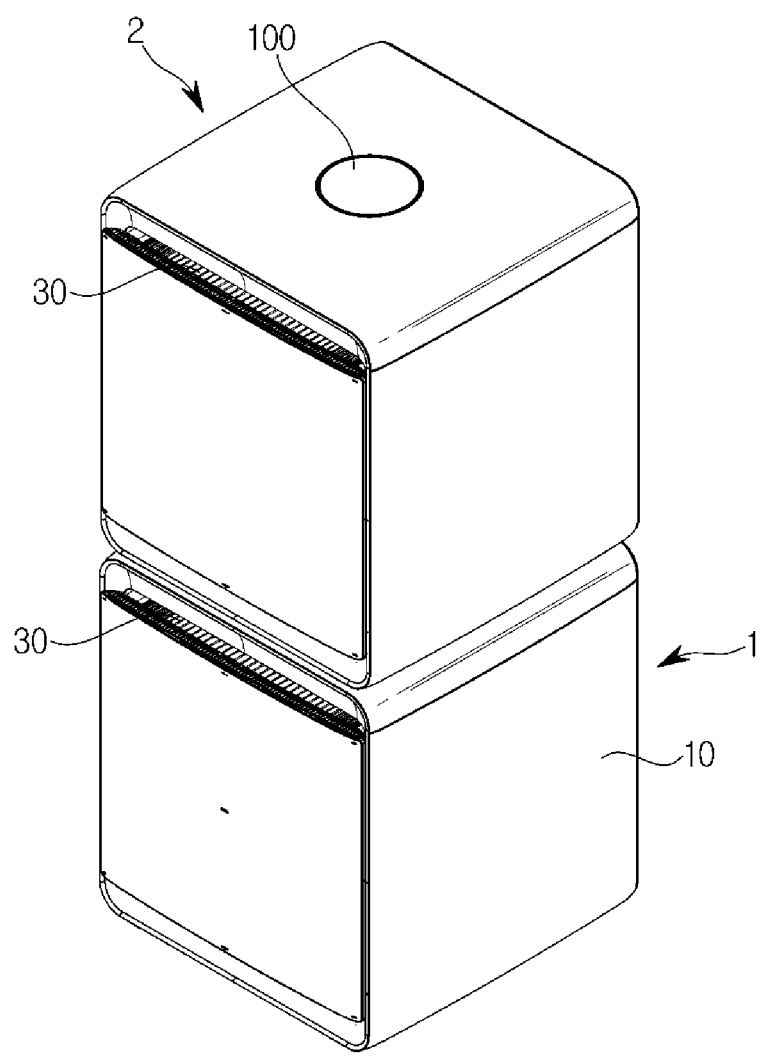
FIG. 2 is a view illustrating the air cleaning module according to an embodiment, particularly a state in which the first air cleaning module and the second air cleaning module are coupled to each other.
Figure 3:
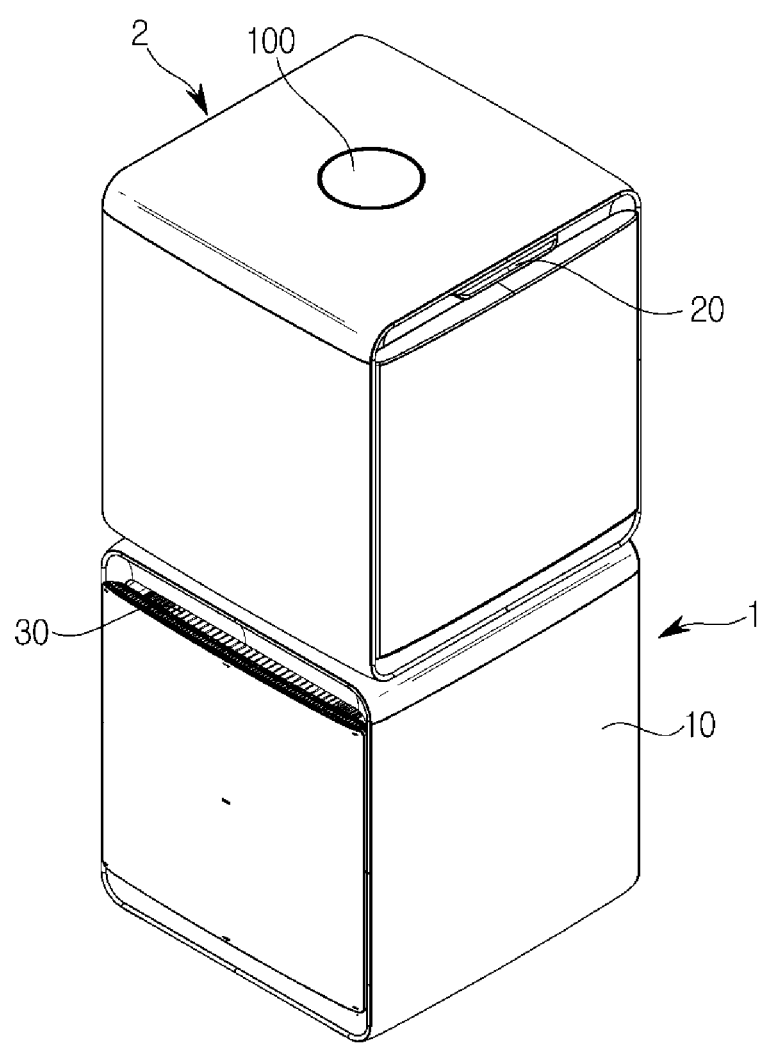
FIG. 3 is a view illustrating the air cleaning module of FIG. 2, particularly a state in which the second air cleaning module rotates about the first air cleaning module.

FIG. 1 is a view illustrating an air cleaning module according to an embodiment, particularly a state in which a first air cleaning module and a second air cleaning module are separated. FIG. 2 is a view illustrating the air cleaning module according to an embodiment, particularly a state in which the first air cleaning module and the second air cleaning module are coupled to each other. FIG. 3 is a view illustrating the air cleaning module of FIG. 2, particularly a state in which the second air cleaning module rotates about the first air cleaning module.

As illustrated in FIGS. 1 to 3, according to an embodiment, an air cleaner may include a first air cleaning module 1 and a second air cleaning module 2.

Hereinafter two air cleaning modules will be described as an example, but is not limited thereto. Three or more air cleaning modules may be provided and each thereof may be separated or coupled. Since the first air cleaning module 1 and the second air cleaning module 2 have the same configuration, except that the first air cleaning module 1 and the second air cleaning module 2 are coupled or separated, only the first air cleaning module 1 will be described, and a description of the second air cleaning module 2 will be omitted.

In the description, an air cleaner will be described as an example, but the present disclosure may be applied to a humidifier and a dehumidifier. In addition, modules having different functions, such as an air cleaner and a humidifier, and a humidifier and a dehumidifier, may be coupled or separated.

The first air cleaning module 1 may include a body 10 having an inlet 20 to which air is sucked, and an outlet 30 to which the sucked air is discharged. Although not shown in the drawings, a filter unit and a blower fan may be provided inside of the body 10, wherein the blower fan may suck external air via the inlet 20 and discharge the air to the outlet 30, and the filter unit may purify the air sucked via the inlet 20.

As illustrated in FIG. 1, when the first air cleaning module 1 and the second air cleaning module 2 are separated, the first air cleaning module 1 and the second air cleaning module 2 may be operated independently. Therefore, the first air cleaning module 1 and the second air cleaning module 2 may purify air in different indoor spaces. When a residential space has a plurality of small indoor spaces, it may be efficient that the first air cleaning module 1 and the second air cleaning module 2 are separated and purify air in different indoor spaces.

The first air cleaning module 1 may include a first connection unit 100 provided at an upper surface of the body 10, and a second connection unit 200 provided at a lower surface of the body 10.

The first connection unit 100 and the second connection unit 200 may be configured to be detachably coupled to each other. In addition, the first connection unit 100 and the second connection unit 200 may be configured to be rotatable in a coupled state. When the first air cleaning module 1 and the second air cleaning module 2 are operated independently, each of the first air cleaning module 1 and the second air cleaning module 2 may be provided rotatably about the floor surface. In addition, the first air cleaning module 1 and the second air cleaning module 2 may be rotatable during operation. That is, the first air cleaning module 1 and the second air cleaning module 2 may be rotatable relative to each other regardless of whether the air cleaning modules 1 and 2 are operated or not. FIG. 3 illustrates a case in which the second air cleaning module 2 rotates about the first air cleaning module 1 by 90 degrees, but it is merely an example. Therefore, there may be no limitation in a rotation angle of the second air cleaning module 2 about the first air cleaning module 1. In other words, the second air cleaning module 2 may rotate about the first air cleaning module 1 by 360 degrees.

The first air cleaning module 1 and the second air cleaning module 2 each include the first connection unit and the second connection unit. When the first connection unit provided on the upper surface of the first air cleaning module 1 is coupled to the second connection unit provided on the lower surface of the second air cleaning module 2, the first air cleaning module 1 and the second air cleaning module 2 may be coupled to each other. In this time, the first air cleaning module 1 may be disposed in the lower side and the second air cleaning module 2 may be disposed in the upper side of the first air cleaning module 1, as illustrated in FIGS. 2 and 3. Alternatively, when the first connection unit provided on the upper surface of the second air cleaning module 2 is coupled to the second connection unit provided on the lower surface of the first air cleaning module 1, the first air cleaning module 1 and the second air cleaning module 2 may be coupled to each other. In this time, the second air cleaning module 2 may be disposed in the lower side and the first air cleaning module 1 may be disposed in the upper side of the second air cleaning module 2, although not shown in the drawings.

As mentioned above, since the first connection unit 100 and the second connection unit 200 are rotatable in the coupled state, the first air cleaning module 1 and the second air cleaning module 2 may are relatively rotatable in the coupled state. Accordingly, the outlet 30 of the first air cleaning module 1 and the outlet 30 of the second air cleaning module 2 may be arranged in different directions, as illustrated in FIG. 3. Since the outlet 30 of the first air cleaning module 1 and the outlet 30 of the second air cleaning module 2 are disposed opposite to each other, it may be possible to entirely purify air in a large indoor space at a faster speed. Alternatively, when a user wants to intensively purify air in a certain direction, the outlet 30 of the first air cleaning module 1 and the outlet 30 of the second air cleaning module 2 may be disposed in the same direction, as illustrated in FIG. 2.

The first air cleaning module 1 and the second air cleaning module 2 may be coupled in a vertical direction. When the first air cleaning module 1 and the second air cleaning module 2 are coupled in the left and right direction or the front and rear direction, there may be no difference in a floor area occupied by the first air cleaning module 1 and the second air cleaning module 2 between before and after the coupling, so that it is difficult to take advantage of the merit of coupling of the two modules. According to an embodiment, the first connection unit 100 and the second connection unit 200 are disposed on the upper surface and the lower surface of the body 10, respectively and thus the first air cleaning module 1 and the second air cleaning module 2 are coupled to each other in the vertical direction. When the first air cleaning module 1 and the second air cleaning module 2 are coupled in the vertical direction, the purifying capacity may be doubled but a floor area occupied by two air cleaning modules may be the same as a floor area occupied by a single air cleaning module. Therefore, the capacity for each area occupied by the air cleaning module may be increased and thus the space utilization may be improved. As mentioned above, more than three air cleaning modules may be provided and thus it may be possible to further improve the capacity for each area according to the number of the air cleaning modules. However, when four or more air cleaning modules are coupled in the vertical direction, a height thereof may be too high and thus the user convenience may be deteriorated. Therefore, it may be appropriate that the number of the air cleaning modules coupled in the vertical direction is equal to or less than three.

Figure 4:
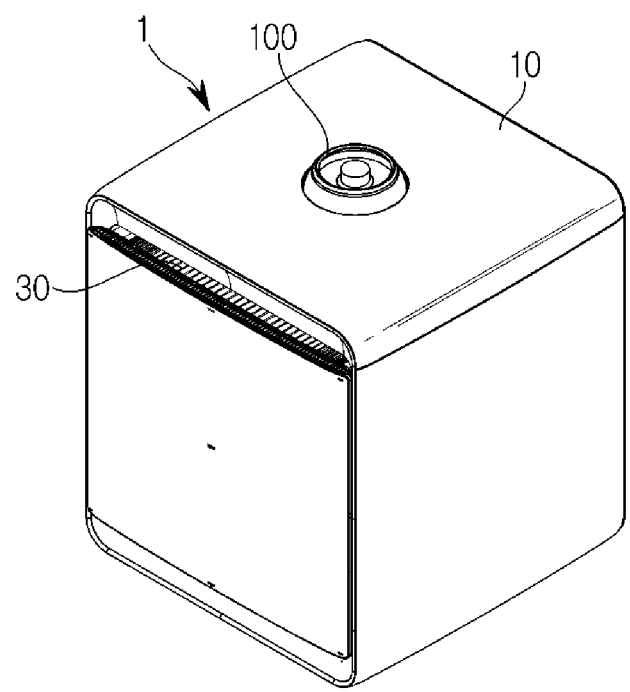
FIG. 4 is a view illustrating a case in which the first connection unit is exposed to the outside of the air cleaning module according to an embodiment.
Figure 5:
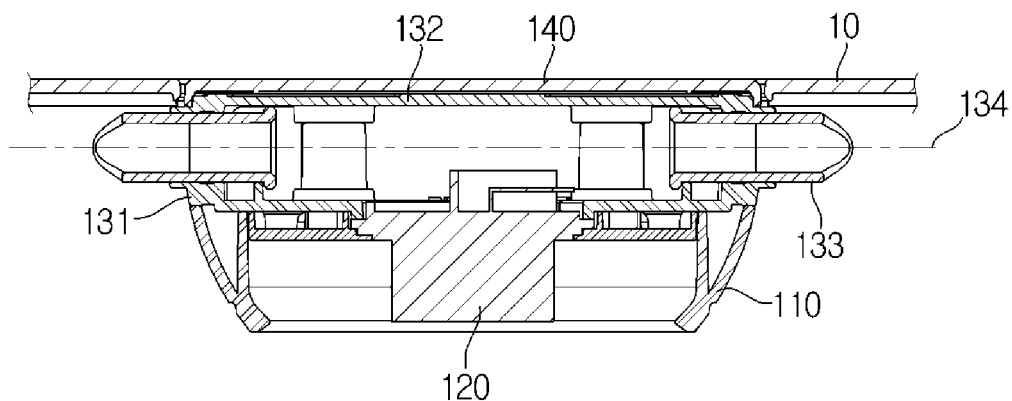
FIG. 5 is a cross-sectional view illustrating a case in which the first connection unit is disposed inside of the air cleaning module according to an embodiment.
Figure 6:
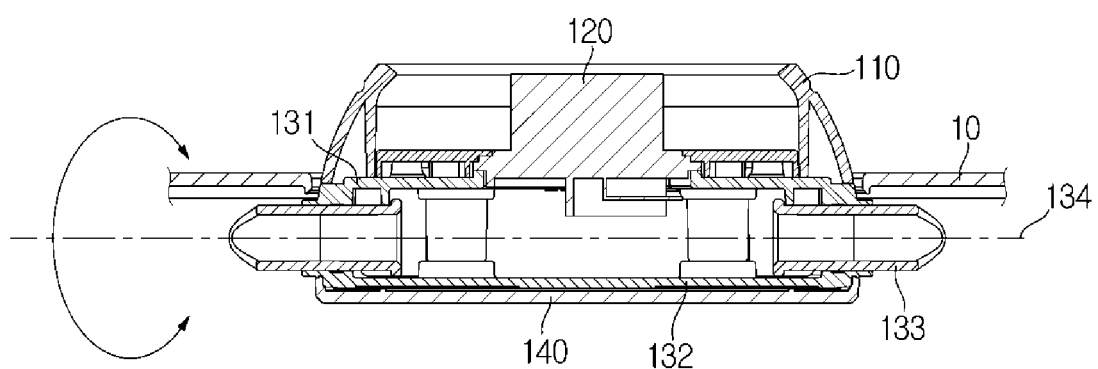
FIG. 6 is a cross-sectional view illustrating a case in which the first connection unit is exposed to the outside of the air cleaning module according to an embodiment.

FIG. 4 is a view illustrating a case in which the first connection unit is exposed to the outside of the air cleaning module according to an embodiment. FIG. 5 is a cross-sectional view illustrating a case in which the first connection unit is disposed inside of the air cleaning module according to an embodiment. FIG. 6 is a cross-sectional view illustrating a case in which the first connection unit is exposed to the outside of the air cleaning module according to an embodiment.

As illustrated in FIGS. 1 to 3, the first connection unit 100 may be disposed inside of the body 10. When the first connection unit 100 is disposed inside of the body 10, a cover 140 of the first connection unit 100 may be exposed to an upper surface of the body 10. Before the first connection unit 100 is coupled to the second connection unit 200, the first connection unit 100 may be disposed inside of the body 10, and since there is no a component protruding from the upper surface of the body 10, it is possible to maintain unified and clean design as a whole In other words, when the first connection unit 100 is separated from the second connection unit 200, the first connection unit 100 may be disposed inside of the body 10. The first connection unit 100 may be rotated and exposed to the outside of the body 10 despite of being separated from the second connection unit 200 as described later. However, as described above, it may be possible to maintain the neat design in the overall of the air cleaning module when the first connection unit 100 may not protrude out of the body 10 before being coupled to the second connection unit 200. Therefore, it may be appropriate that the first connection unit 100 is disposed inside of the body 10 when the first connection unit 100 is separated from the second connection unit 200. As illustrated in FIG. 4, the first connection unit 100 may be rotated and exposed to the outside of the body 10 to be coupled to the second connection unit 200. As will be described later, when the first connection unit 100 is exposed to the outside of the body 10, the first connection unit 100 may be coupled to the second connection unit 200.

As illustrated in FIGS. 5 and 6, the first connection unit 100 may be rotatable about a rotation axis 134. When a user intends to combine the first air cleaning module 1 and the second air cleaning module 2, the user may rotate the first connection unit 100 by pressing one side of the first connection unit 100 downward. When the first connection unit 100 rotates, the first connection unit 100 may be exposed to the outside of the body 10, as illustrated in FIG. 4. In this state, when the user presses one side of the first connection unit 100 downward, the first connection unit 100 may be rotated and disposed inside the body 10.

In other words, when the first connection unit 100 is coupled to the second connection unit 200, the first connection unit 100 may protrude out of the body 10. When the first connection unit 100 is disposed inside the body 10 as shown in FIG. 3, the first connection unit 100 may not be coupled to the second connection unit 200. Therefore, when the first connection unit 100 is coupled to the second connection unit 200, the first connection unit 100 may protrude out of the body 10, and at this time, the first connection unit 100 may be coupled to the second connection unit 200.

Figure 7:
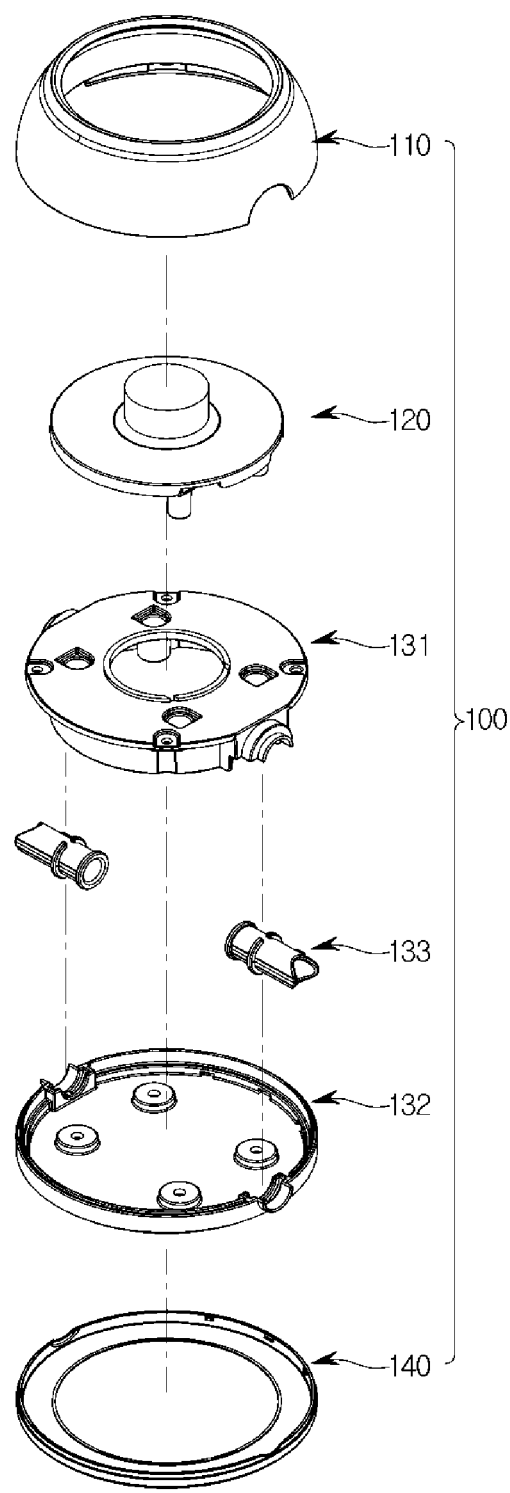
FIG. 7 is an exploded perspective view illustrating the first connection unit according to an embodiment.

FIG. 7 is an exploded perspective view illustrating the first connection unit according to an embodiment.

Figure 8:
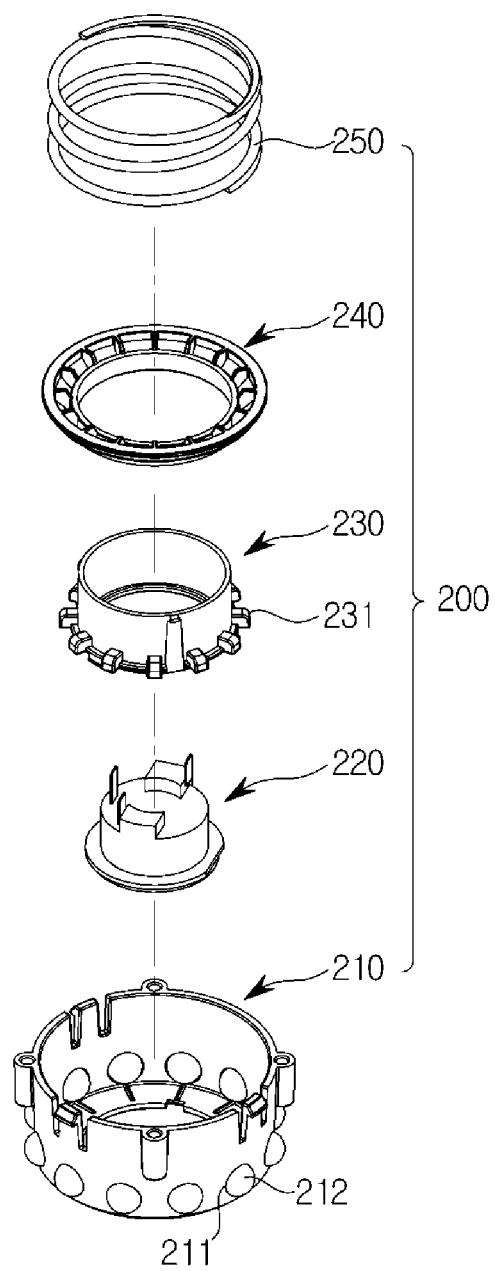
FIG. 8 is an exploded perspective view illustrating the second connection unit according to an embodiment.

FIG. 8 is an exploded perspective view illustrating the second connection unit according to an embodiment.

Hereinafter, the configurations of the first connection unit and the second connection unit according to the embodiment will be described in detail.

The first connection unit 100 may include a first housing 110 having an upper surface and a lower surface opened, a cover 140 covering a lower surface of the first housing 110, a shaft 133 forming the rotation axis 134 of the first connection unit 100, an upper shaft accommodation portion 131 and a lower shaft accommodation portion 132 which are coupled to each other to allow the shaft 133 to be rotatable, and a first power connection portion 120 disposed between the upper shaft accommodation portion 131 and the first housing 110.

The first housing 110 may be formed such that an outer peripheral surface thereof and an inner peripheral surface thereof are inclined downwardly.

The first power connection portion 120 may be coupled to a second power connection portion 220 described later so as to be electrically connected. When the first power connection part 120 of the first air cleaning module 1 is coupled to the second power connection portion 220 of the second air cleaning module 2, the first air cleaning module 1 and the second air cleaning module 2 may be electrically connected. When the first air cleaning module 1 and the second air cleaning module 2 are electrically connected, the first air cleaning module 1 may be integrally operated by operating only the second air cleaning module 2 disposed on the upper portion.

When the first connection unit 100 is disposed inside of the body 10, the cover 140 may form a part of the upper surface of the body 10 and thus the air cleaning module has a clean appearance design.

The second connection unit 200 may include a second housing 210 having a plurality of through holes 211, a plurality of balls 212 coupled to the plurality of through holes 211, the second power connection portion 220 disposed inside of the second housing 210, an elastic member 250 providing an elastic force to the plurality of balls 212, an elastic force transmitting member 240 transmitting the elastic force of the elastic member 250 to the plurality of balls 212, and a stopper 230 limiting the downward movement of the elastic force transmitting member 240.

The second housing 210 may have a substantially cylindrical shape. The second housing 210 may include the plurality of through holes 211 disposed apart from each other in the circumferential direction of the second housing 210. As mentioned above, the plurality of balls 212 may be coupled to the plurality of through holes 211. The plurality of through holes 211 may be provided larger than the plurality of balls 212 to allow the plurality of balls 212 to move radially outward or radially inward of the second housing 210 in the plurality of the through holes 211.

Although not shown in the drawings, the lower surface of the second air cleaning module 2 may be coupled to the upper surface of the second connection unit 200. Accordingly, the upper surface of the second connection unit 200 may be not opened, but closed by the lower surface of the second air cleaning module 2.

The elastic member 250 may be arranged to elastically bias the elastic force transmitting member 240 downward. The elastic force transmitting member 240 may receive the elastic force from the downward by the elastic member 250 and transmit the received elastic force to the plurality of balls 212. The elastic force transmitting member 240 may be provided in a substantially ring shape, wherein a lower surface of the elastic force transmitting member 240 may be upwardly inclined toward the radially outer side. Due to this shape, when the elastic force transmitting member 240 is moved downward by the elastic member 250, the plurality of balls 212 that are in contact with the elastic force transmitting member 240 may be moved radially outward of the second housing 210.

The elastic force transmitting member 240 may be configured to be movable up and down. The elastic force transmitting member 240 may be coupled to the stopper 230 coupled to the inside of the second housing 210. The stopper 230 may include a plurality of protrusions 231 disposed apart from each other in a lower portion in a circumferential direction. The plurality of protrusions 231 may prevent the elastic force transmitting member 240 from passing through the stopper 230 to the downward. That is, since the stopper 230 includes the plurality of protrusions 231, the stopper 230 may prevent the elastic force transmitting member 240 from moving to the lower side of the plurality of protrusions 231.

The second power connection portion 220 may be disposed in the inside of the second housing 210 and the stopper 230. As described above, the second power connection portion 220 may be coupled and electrically connected to the first power connection portion 120. The first power connection portion 120 and the second power connection portion 220 may be rotatable in the coupled state.

Figure 9:
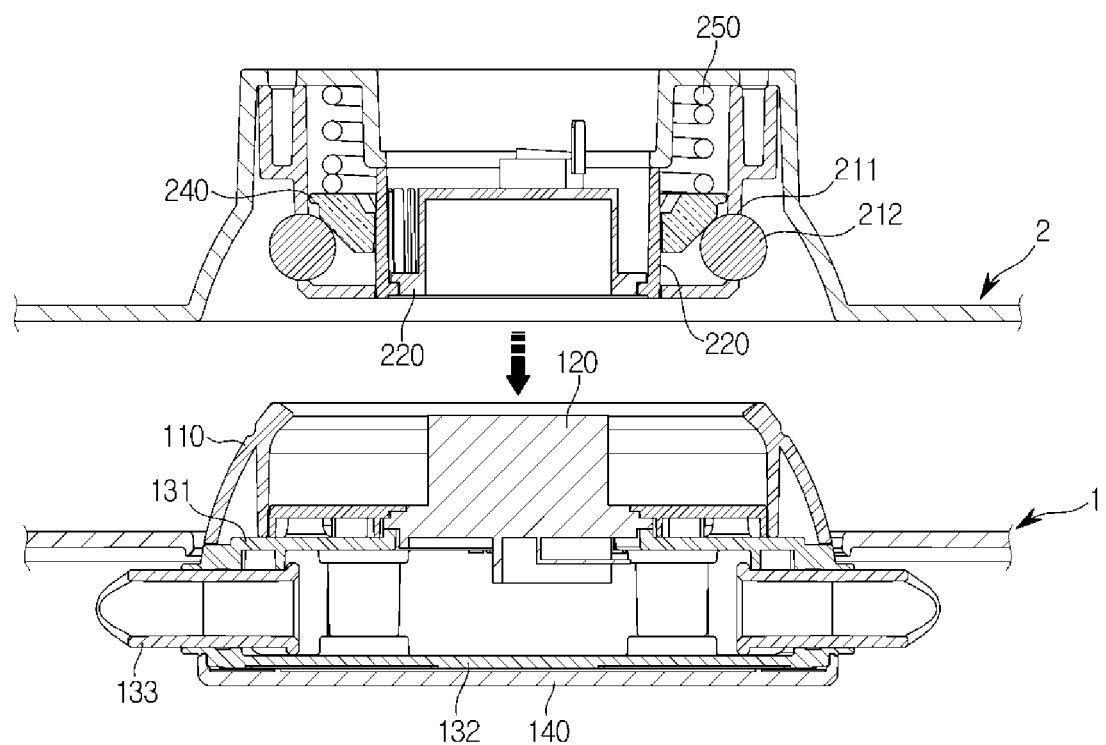
FIG. 9 is a side cross-sectional view illustrating before the first connection unit and the second connection unit are coupled according to an embodiment.

FIG. 9 is a side cross-sectional view illustrating before the first connection unit and the second connection unit are coupled according to an embodiment.

Figure 10:
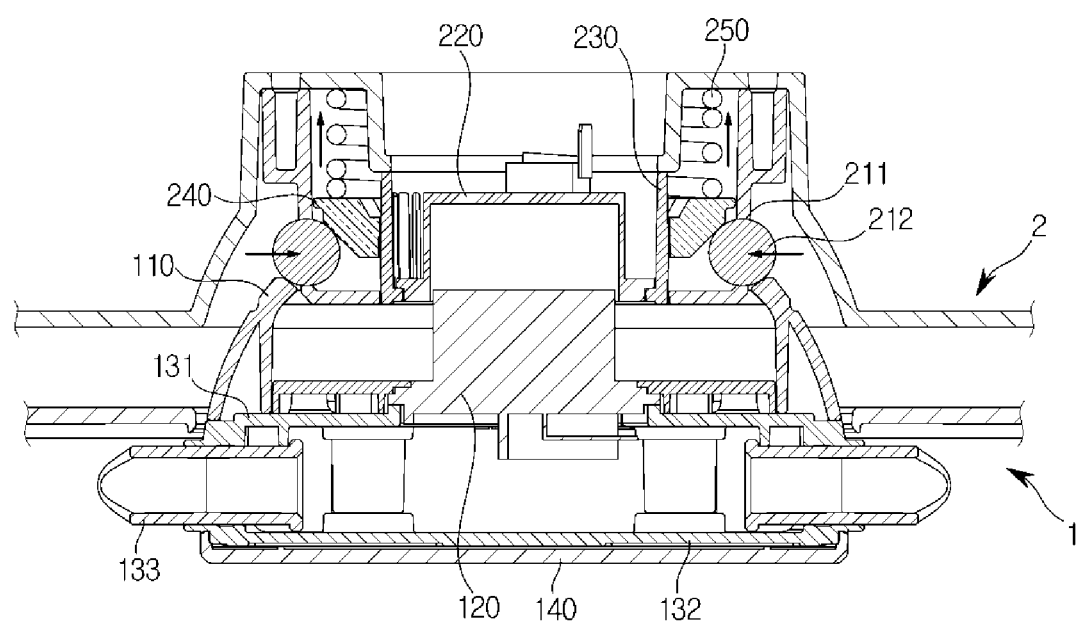
FIGS. 10 and 11 are side sectional views illustrating a case in which the first connection unit and the second connection unit are coupled according to an embodiment.
Figure 11:
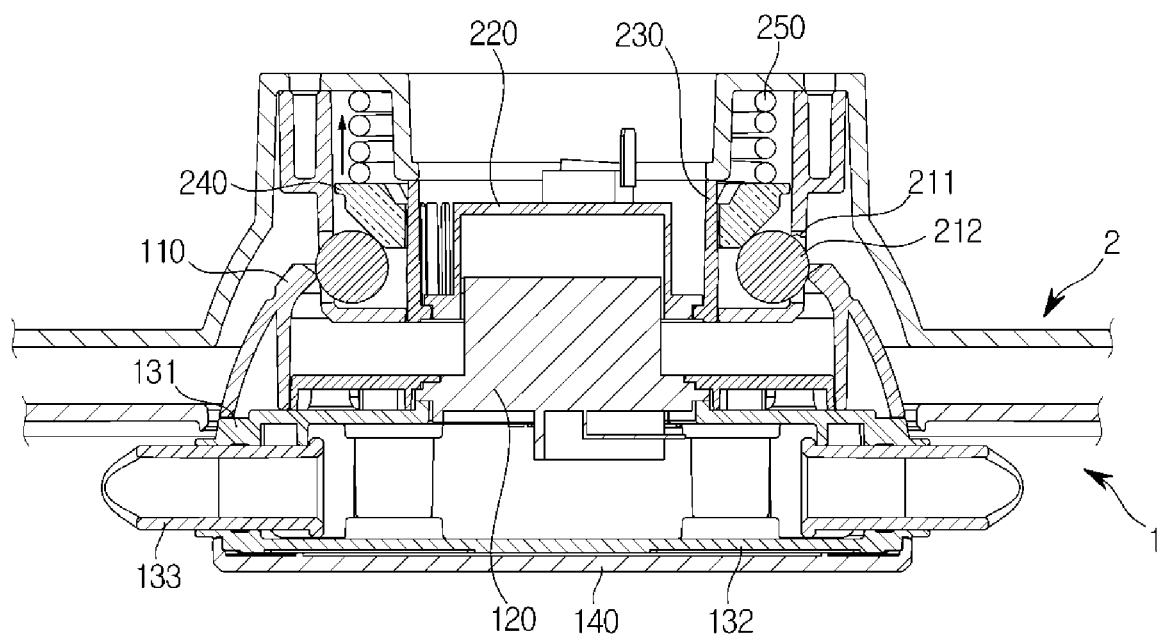

FIGS. 10 and 11 are side sectional views illustrating a case in which the first connection unit and the second connection unit are coupled according to an embodiment.

Figure 12:
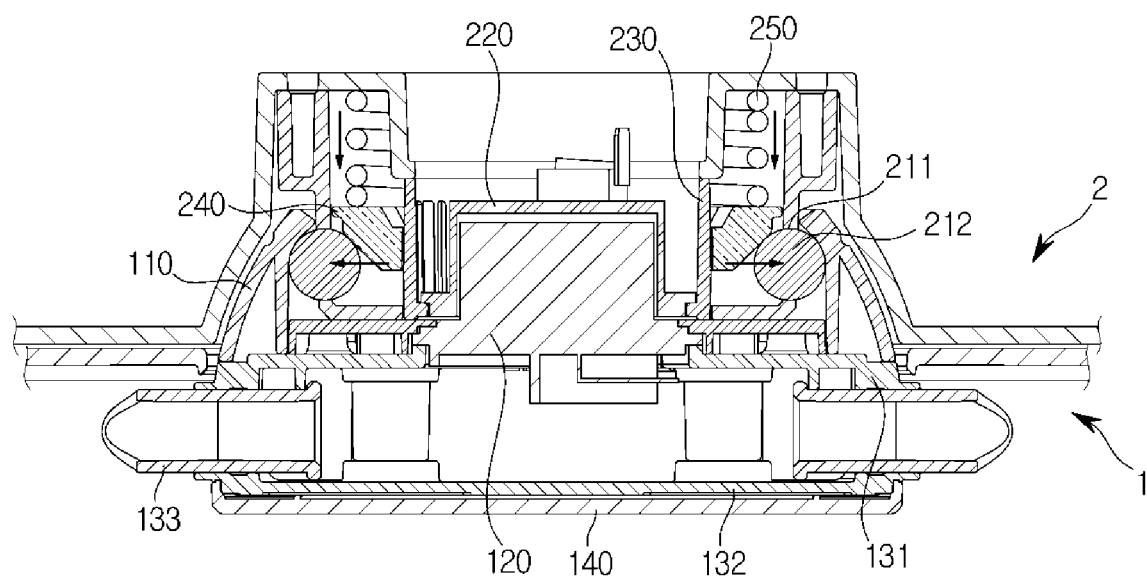
FIG. 12 is a side cross-sectional view illustrating after the first connection unit and the second connection unit are coupled according to an embodiment.

FIG. 12 is a side cross-sectional view illustrating after the first connection unit and the second connection unit are coupled according to an embodiment.

Hereinafter, a method of coupling the first connection unit and the second connection unit according to an embodiment will be described in detail.

As illustrated in FIG. 9, the plurality of balls 212 of the second connection unit 200 may protrude to the outside of the second housing 210 through the plurality of through holes 211 before the first connection unit 100 and the second connection unit 200 are coupled to each other.

As illustrated in FIG. 10, when the first connection unit 100 and the second connection unit 200 start to be coupled to each other, the plurality of balls 212 and the first housing 110 may be in contact, and the plurality of balls 212 may be moved radially inwardly of the first housing 110 along the inclined upper surface of the first housing 110. Since the upper surface of the first housing 110 is downwardly inclined toward the center of the first housing 110, the plurality of balls 212 may be moved toward the center of the first housing 110 along the inclined upper surface. At this time, the plurality of balls 212 may move the elastic force transmitting member 240 upward. Since the lower surface of the elastic force transmitting member 240 is provided upwardly inclined toward the radially outer side of the first housing 110, the elastic force transmitting member 240 may be moved upward when the plurality of balls 212 is moved toward the inside of the first housing 110. Meanwhile, in order to move the plurality of balls 212 and the elastic force transmitting member 240, a force exceeding the elastic force of the elastic member 250 should be applied.

As illustrated in FIG. 11, the plurality of balls 212 may be moved toward the radially inner side of the first housing 110 as much as possible, while the first connection unit 100 and the second connection unit 200 are coupled to each other. At this time, the elastic force transmitting member 240 may be moved upward as much as possible, and the elastic force of the elastic member 250 may be accumulated to the maximum.

As illustrated in FIG. 12, after coupling between the first connection unit 100 and the second connection unit 200 is completed, the elastic force transmitting member 240 may be moved downward by the accumulated elastic force of the elastic member 250. As the elastic force transmitting member 240 is moved downward, the plurality of balls 212 may be moved to the radially outer side of the second housing 210.

When the plurality of balls 212 protrudes to the outside of the second housing 210, the plurality of balls 212 may come into contact with the inner surface of the first housing 110 and thus the coupled state may be maintained.

In addition, although the first connection unit 100 and the second connection unit 200 are coupled to each other, the first connection unit 100 and the second connection unit 200 may be rotated with respect to the vertical axis.

Meanwhile, the process of separating the first connection unit 100 from the second connection unit 200 may be performed in the reverse order of the coupling process. In order to separate the first connection unit 100 from the second connection unit 200, it may be required that the second connection unit 200 is lifted upward, and a force which is stronger than the elastic force which is applied to the elastic force transmitting member 240 and a plurality of balls 212, may be needed.

Figure 13:
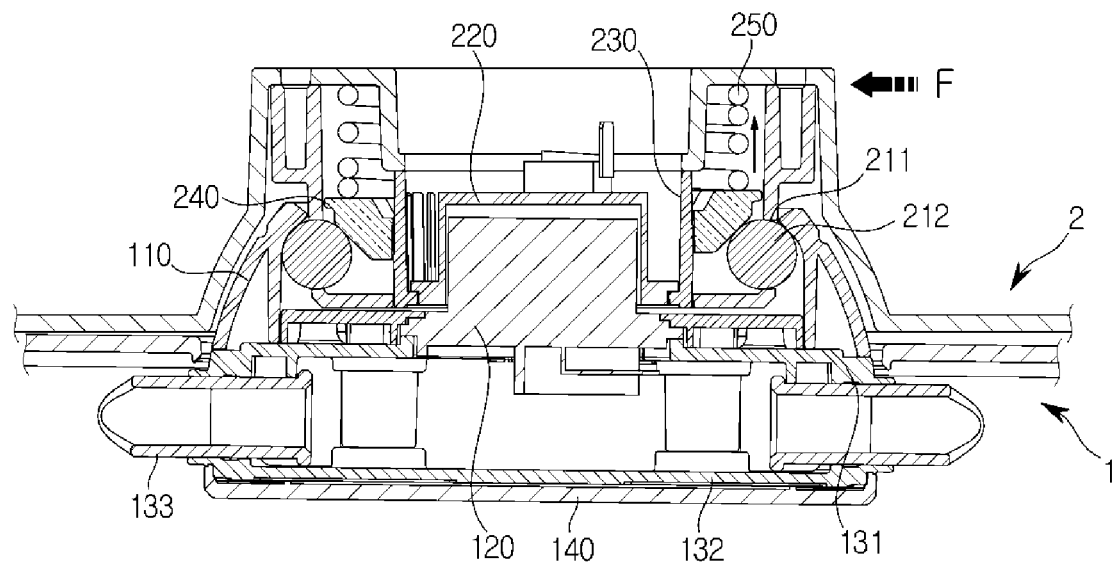
FIG. 13 is a side cross-sectional view illustrating a case in which a lateral force is applied to the second connection unit in a state in which the first connection unit and the second connection unit are coupled to each other, according to an embodiment.

FIG. 13 is a side cross-sectional view illustrating a case in which a lateral force is applied to the second connection unit in a state in which the first connection unit and the second connection unit are coupled to each other, according to an embodiment.

It may be required that the first air cleaning module 1 and the second air cleaning module 2 are not separated although a lateral force is applied to the second air cleaning module 2 disposed in the upper side when the first air cleaning module 1 and the second air cleaning module 2 are coupled to each other. This is because the second air cleaning module 2 may collide with the floor and be damaged, when the first air cleaning module 1 and the second air cleaning module 2 are separated although a small force is applied in the lateral direction. In addition, since a user typically moves the first air cleaning module 1 and the second air cleaning module 2 by holding the second air cleaning module 2 disposed in the upper side, it is required that the first air cleaning module 1 and the second air cleaning module 2 are not easily separated by the lateral force.

As illustrated in FIG. 13, according to an embodiment, when a lateral force (F) is applied in a state in which the first connection unit 100 and the second connection unit 200 are coupled to each other, the elastic force of the elastic member 250 may be concentrated on one side. That is, when the lateral force (F) is applied from the right side to the left side with reference to FIG. 13, the right side of the elastic member 250 is compressed more than the left side of the elastic member 250 to accumulate the elastic force. The accumulated elastic force may move the elastic force transmitting member 240 downward, and when the elastic force transmitting member 240 is moved downward, the plurality of balls 212 may be moved to the outside of the second housing 210. The plurality of balls 212 is needed to move to the inside of the second housing 210 in order that the first connection unit 100 and the second connection unit 200 are separated, and thus when the plurality of balls 212 is moved to the outside of the second housing 210, the first connection unit 100 and the second connection unit 200 may be not separated. Therefore, according to an embodiment, the first connection unit 100 and the second connection unit 200 may not be easily separated even if the lateral force is applied.

Figure 14:
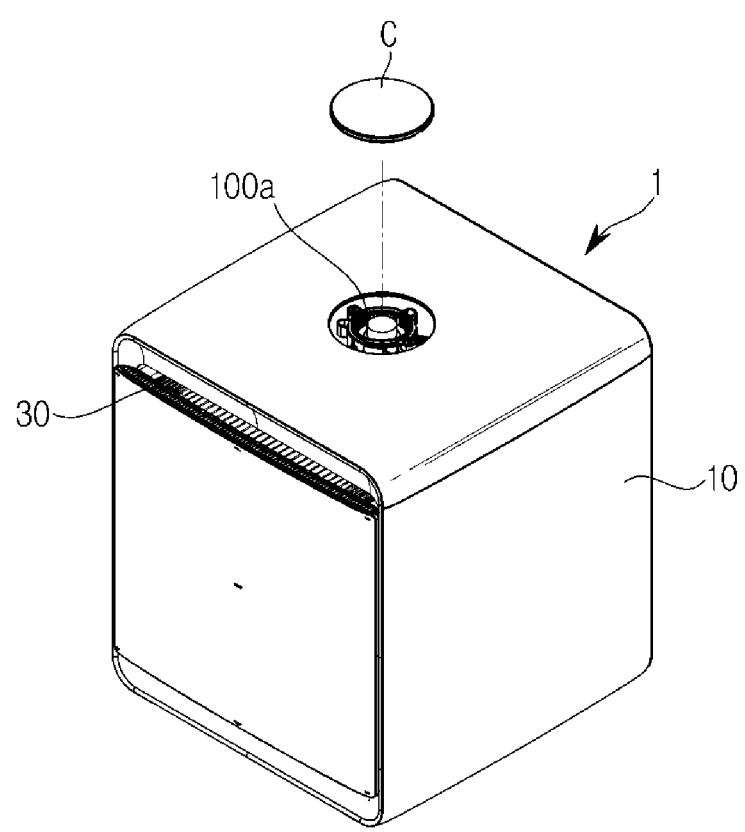
FIG. 14 is a view illustrating a case in which a first connection unit is retracted into a body in an air cleaning module according to another embodiment.

FIG. 14 is a view illustrating a case in which a first connection unit is retracted into a body in an air cleaning module according to another embodiment.

Figure 15:
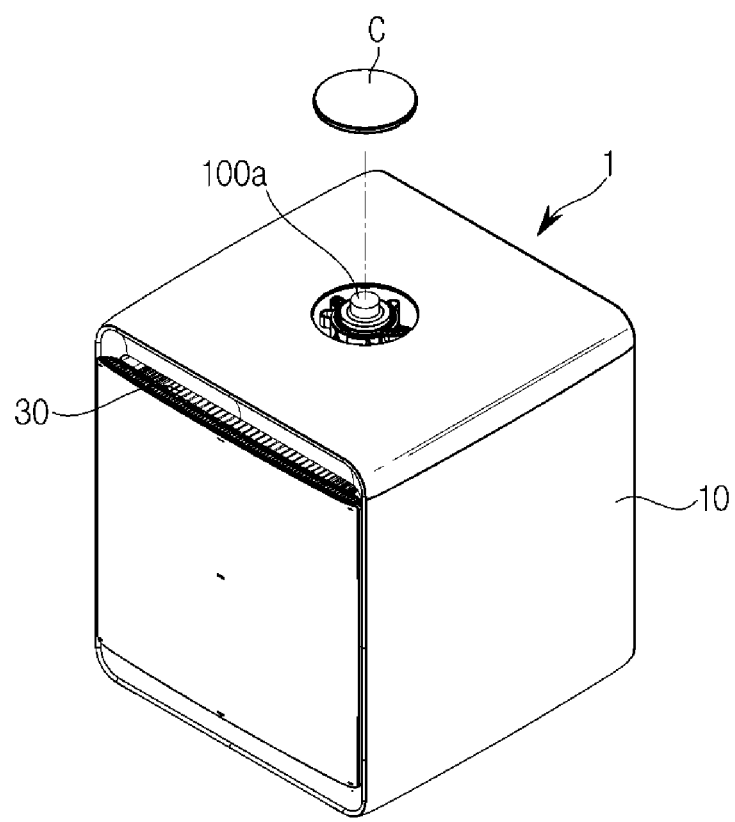
FIG. 15 is a view illustrating a case in which a second connection unit is pulled out from the body in the air cleaning module according to another embodiment.

FIG. 15 is a view illustrating a case in which a second connection unit is pulled out from the body in the air cleaning module according to another embodiment.

Hereinafter, the air cleaning module according to another embodiment will be described in detail.

As illustrated in FIG. 14, according to another embodiment, an air cleaning module may include a first connection unit 100*a* provided on an upper surface of a body 10.

The first connection unit 100*a* may include a cover (C). The cover (C) may be detachably coupled to the upper surface of the body 10. Before the first connection unit 100*a* and a second connection unit (not shown) are coupled to each other, the cover (C) is coupled to the upper surface of the body 10 to cover the first connection unit 100*a* so that the first connection unit 100*a* is not exposed to the outside. Meanwhile, according to another embodiment, the second connection unit may be provided with only a second power supply connection portion 220 (refer to FIG. 8), and coupled to the lower surface of the body 10.

When the cover (C) is separated from the upper surface of the body 10, the first connection unit 100*a* may be retracted into the body 10, as illustrated in FIG. 14.

When the first connection unit 100*a* is separated from the second connection unit 200*a*, the first connection unit 100*a* may be disposed inside of the body 10, as illustrated in FIG. 14. In this time, it may be appropriate that the cover (C) is coupled to the upper surface of the body 10 so that the first connection unit 100*a* may not be seen from the outside. This is because of improving a sense of aesthetics of the air cleaning module, and thus the first connection unit 100*a* may protrude out of the body 10 although the first connection unit 100*a* is separated from the second connection unit 200*a*, which is not related to the operation of the air cleaning module. As illustrated in FIG. 15, the first connection unit 100*a* may be pulled out from the body 10 to be coupled to the second connection unit. That is, when the first connection unit 100*a* is coupled to the second connection unit 200*a*, the first connection unit 100*a* may protrude out of the body 10. This is because it is impossible that the first connection unit 100*a* is coupled to the second connection unit 200*a* in a state in which the first connection unit 100*a* is disposed inside of the body 10. Particularly, the first connection unit 100*a* may include a first power connection portion 160*a*, wherein the first power connection portion 160*a* is retracted into the body 10 and then pulled out from the body 10.

A user may press the first power connection portion 160*a* downward to pull the first power connection portion 160*a* out from the inside of the body 10 to the outside of the body 10, or to insert the first power connection portion 160*a* into the inside of the body 10 from the outside of the body 10. That is, when the user applies a force, which is greater than the elastic force of an elastic member 130*a* described later, to the first power connection portion 160*a* downward, the first power connection portion 160*a* may be retracted into the body 10 or pulled out from the body 10*a*. The retraction and the pull out of the first power connection portion 160*a* will be described later.

Figure 16:
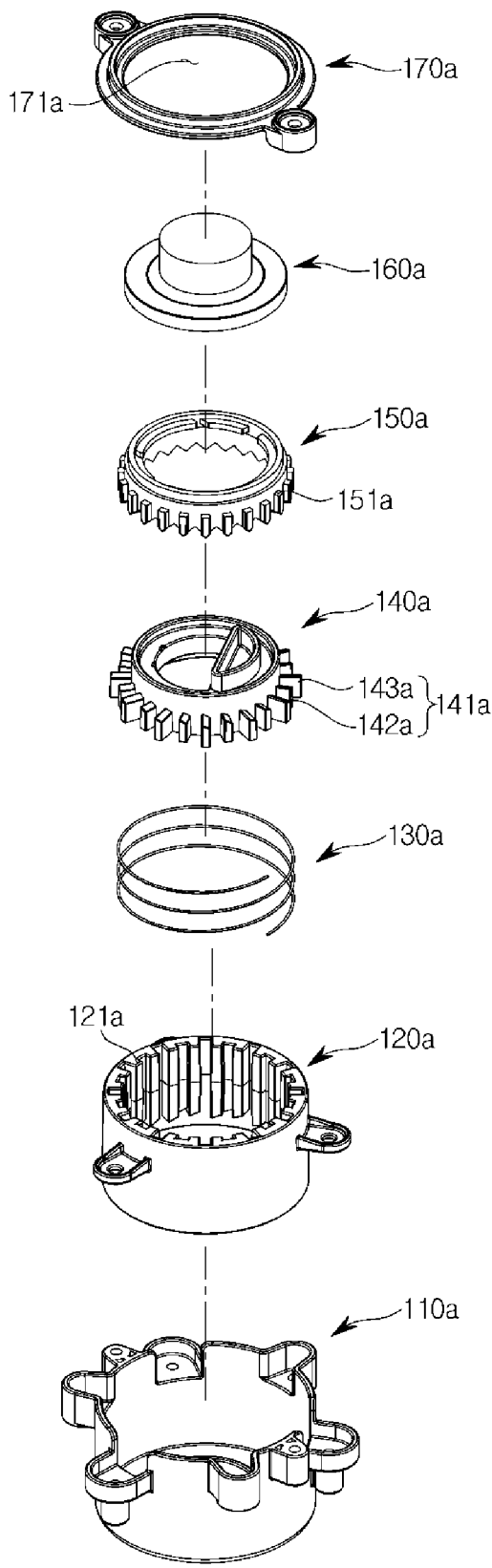
FIG. 16 is an exploded perspective view illustrating the first connection unit according to another embodiment.

FIG. 16 is an exploded perspective view illustrating the first connection unit according to another embodiment.

As illustrated in FIG. 16, according to another embodiment, the first connection unit 100*a* may include a lower housing 110*a* in which the first power connection portion 160*a* is disposed, a gear housing 120*a* disposed inside of the lower housing 110*a* and provided with an inner gear portion 121*a* formed in an inner circumferential surface, an upper gear 150*a* and a lower gear 140*a* which are coupled to each other to be movable inside of the gear housing 120*a* in the vertical direction, and an upper housing 170*a* limiting the upward movement of the upper gear 150*a* and the first power connection portion 160*a*.

The lower housing 110*a* may support the elastic member 130*a* to prevent the elastic member 130*a* disposed inside of the lower housing 110*a*, from escaping downward of the lower housing 110*a*.

The inner gear portion 121*a* may be formed on the inner circumferential surface of the gear housing 120*a*, wherein the gear housing 120*a* may be coupled to the inner side of the lower housing 110*a*. The gear housing 120*a* may be coupled to the lower housing 110a through a coupling member (not shown) and then fixed to the lower housing 110a.

The upper gear 150a and the lower gear 140a may be arranged in the vertical direction. The upper gear 150a and the lower gear 140a may be coupled to the inside of the gear housing 120a. The upper gear 150a may include a first gear portion 151a formed on an outer circumferential surface of the upper gear 150a, and the lower gear 140a may include a second gear portion 141a formed on an outer circumferential surface of the lower gear 140a, wherein the first gear portion 151a and the second gear portion 141a may be engaged with the inner gear portion 121a of the gear housing 120a. When the upper gear 150a and the lower gear 140a are coupled to the gear housing 120a, the upper gear 150a and the lower gear 140a may be moved in the vertical direction. However, when the lower gear 140a is disposed inside of the gear housing 120a, the upward movement of the lower gear 140a may be selectively limited, described later.

The elastic member 130a may be disposed in contact with the lower gear 140a and the lower housing 110a. That is, an upper portion of the elastic member 130a may be in contact with the lower gear 140a and a lower portion of the elastic member 130a may be in contact with the lower housing 110a. Accordingly, the elastic member 130a may provide the elastic force to the lower gear 140a upward.

The first power connection portion 160a may be coupled to an upper portion of the upper gear 150a. The first power connection portion 160a may be moved in the vertical direction according to the vertical movement of the lower gear 140a. A detail description will be described later.

The upper housing 170a may be formed in a ring shape having a hollow 171a, wherein the first power connection portion 160a may be moved to the upper side through the hollow 171a regardless of the presence of the upper housing 170a.

The upper housing 170a may prevent the upper gear 150a from moving upward more than a predetermined height. That is, the upper housing 170a may limit the upward movement of the upper gear 150a.

Figure 17:
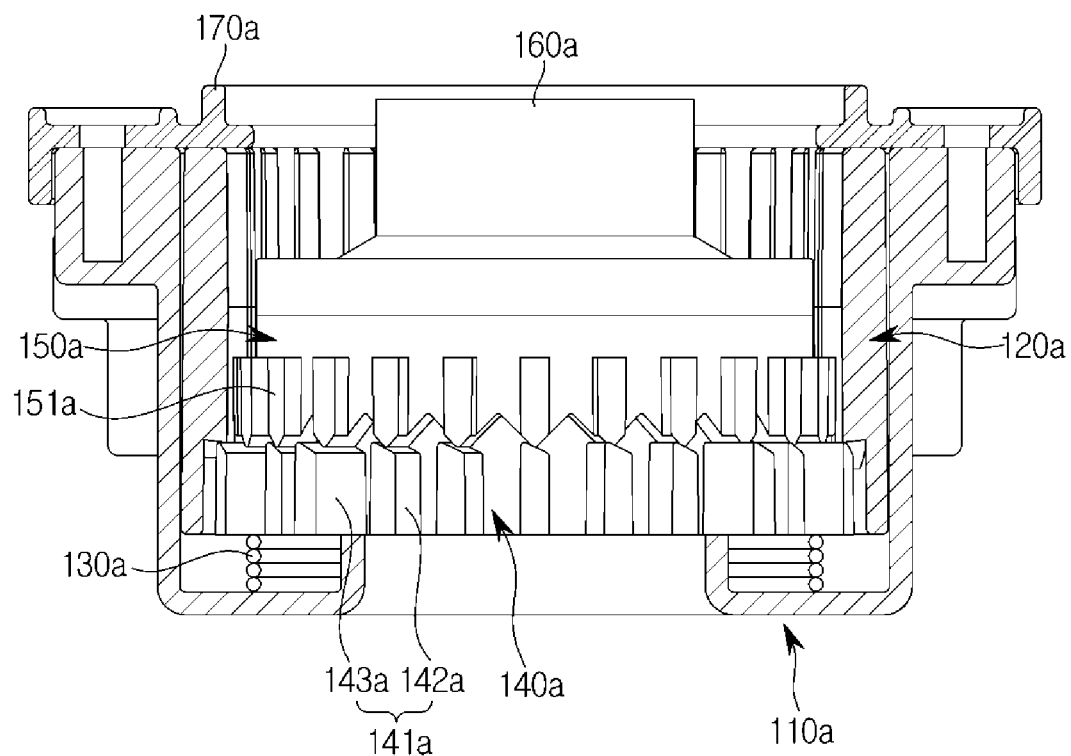
FIG. 17 is a side cross-sectional view illustrating a state in which a first connection unit is retracted according to another embodiment.
Figure 18:
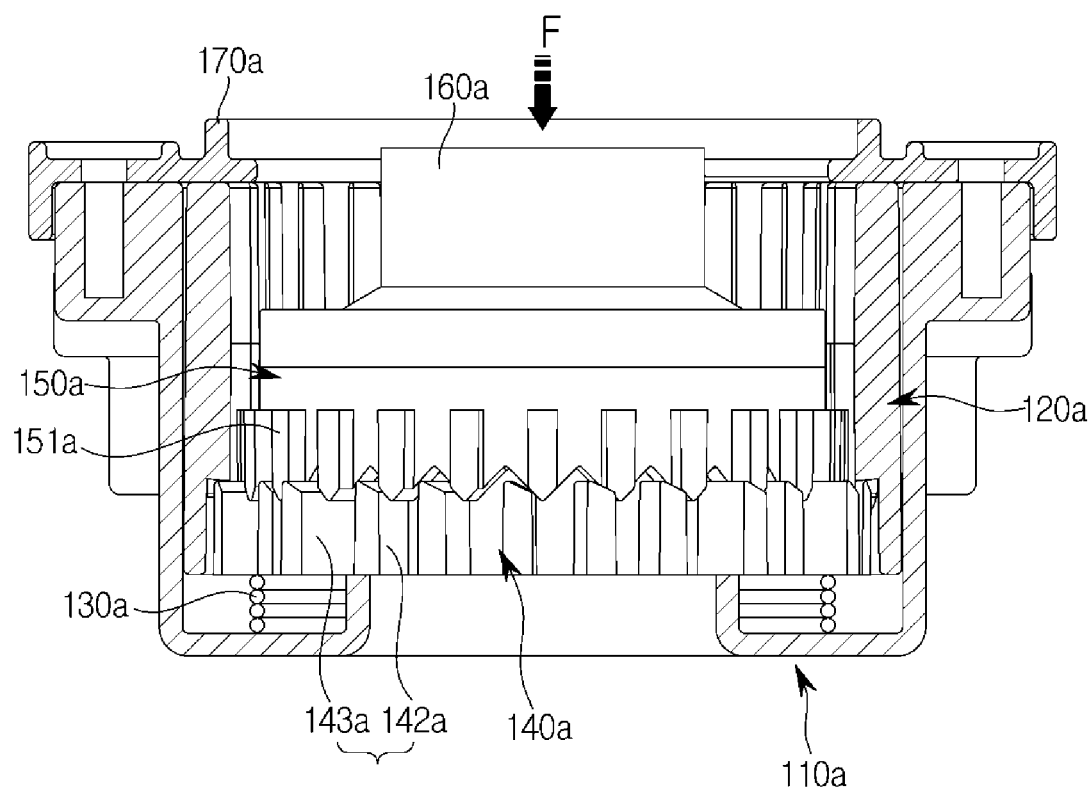
FIG. 18 is a side cross-sectional view illustrating a state in which the first connection unit is pulled out is changed from the state in which the first connection unit is retracted according to another embodiment.
Figure 19:
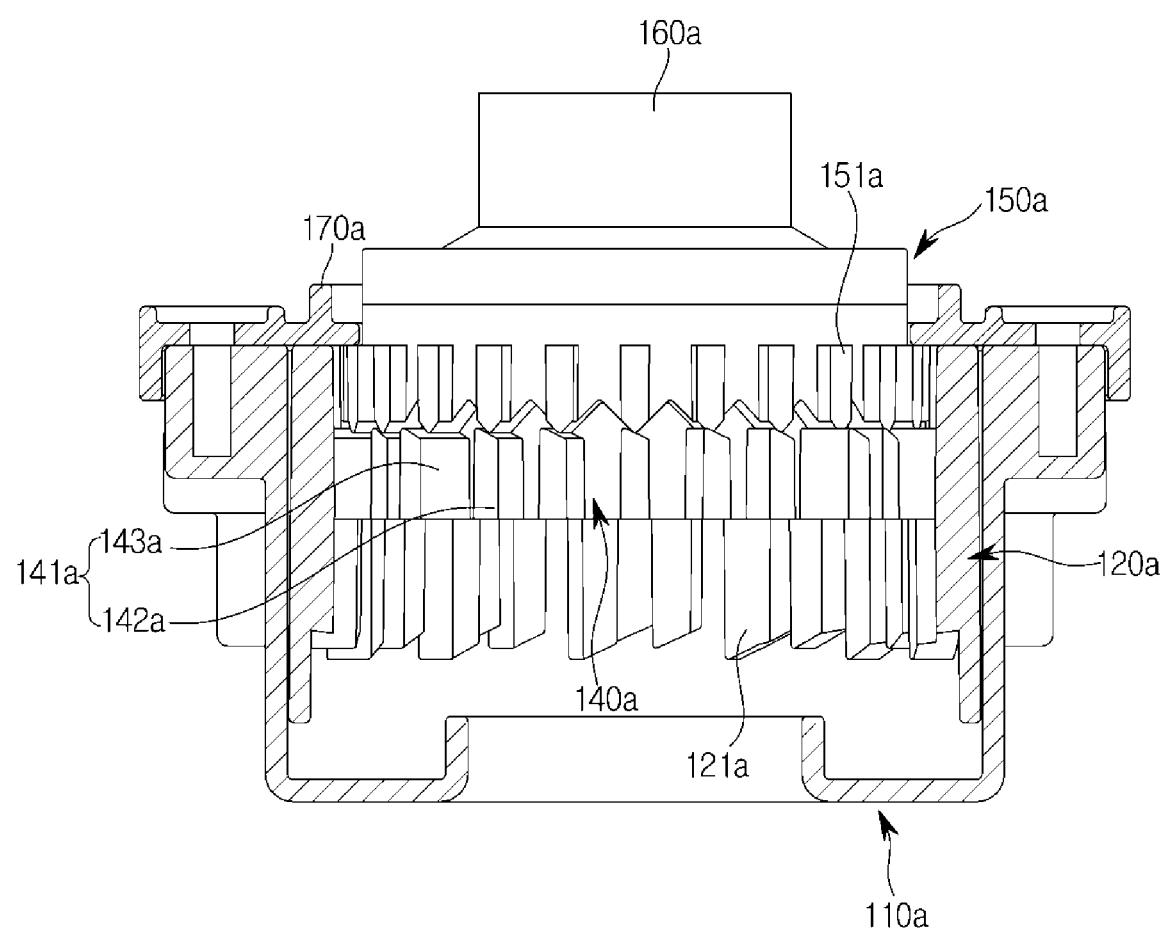
FIG. 19 is a side cross-sectional view illustrating the state in which the first connection unit is pulled out according to another embodiment.

FIG. 17 is a side cross-sectional view illustrating a state in which a first connection unit is retracted according to another embodiment. FIG. 18 is a side cross-sectional view illustrating a state in which the first connection unit is pulled out is changed from the state in which the first connection unit is retracted according to another embodiment. FIG. 19 is a side cross-sectional view illustrating the state in which the first connection unit is pulled out according to another embodiment.

Hereinafter, the retraction and the pull out of the first connection unit according to another embodiment will be described in detail with reference to FIGS. 17 to 21.

As illustrated in FIG. 17, when the first power connection portion 160a of the first connection unit 100a is retracted, the second gear portion 141a of the lower gear 140a may prevent from moving in the upper side by being locked to the inner gear portion 121a of the lower housing 110a. In this time, although the elastic member 130a provides the elastic force to the lower gear 140a upward, the upward movement of the lower gear 140a may be limited by the inner gear portion 121a. The upper gear 150a may be provided on the upper side of the lower gear 140a and the upper gear 150a may be maintained to be in contact with the lower gear 140a due to a weight of the upper gear 150a. The first power connection portion 160a may be coupled to the upper surface of the upper gear 150a. The first power connection portion 160a may be moved with the upper gear 150a in the vertical direction. As illustrated in FIG. 17, since the lower gear 140a is locked to the inner gear portion 121a and placed in a relatively lower retraction position, the upper gear 150a and the first power connection portion 160a disposed in the upper side of the lower gear 140a may be also placed in the retraction position. In the retraction position, the first power connection portion 160a may be inserted into the inside of the upper housing 170a and the first power connection portion 160a may not protrude higher than the upper housing 170a.

As illustrated in FIG. 18, when a user provides the force (F) equal to or greater than the elastic force of the elastic member 130a, to the first power connection portion 160a, the first power connection portion 160a, the upper gear 150a, and the lower gear 140a may be moved downward. When the lower gear 140a is moved downward by more than a certain distance, the lower gear 140a may be a state of being rotated about the vertical axis. In addition, the first gear portion 151a of the upper gear 150a may be provided with a lower surface formed in a substantially serrated shape. Accordingly, the first gear portion 151a may be formed in a shape in which an upwardly inclined surface and a downwardly inclined surface are repeatedly disposed.

The lower gear 140a may include a first protrusion 142a and a second protrusion 143a, wherein the first protrusion 142a and the second protrusion 143a protrude in the radially outer side with different lengths. The first protrusion 142a and the second protrusion 143a may be alternately disposed along the circumferential direction of the lower gear 140a. The first protrusion 142a and the second protrusion 143a may be arranged inclined towards the same direction.

When the upper gear 150a is moved downward due to the shape of the upper gear 150a and the lower gear 140a, the lower gear 140a may be rotated with respect to the vertical axis. FIG. 18 is a view illustrating a case in which the lower gear 140a is rotated with respect to the vertical axis.

As illustrated in FIG. 19, when the lower gear 140a is rotated with respect to the vertical axis, the position of the lower gear 140a may be changed with respect to the gear housing 120a and the upper gear 150a. That is, in comparison with FIG. 17, the position of the first protrusion 142a and the second protrusion 143a may be changed. When the position of the first protrusion 142a and the second protrusion 143a is changed, the upward movement of the lower gear 140a, which is limited by the gear housing 120a, may be allowed. A description thereof will be described with reference to FIGS. 20 and 21.

When the upward movement of the lower gear 140a is allowed, the lower gear 140a may be moved upward by the elastic force of the elastic member 130a, and the upper gear 150a and the first power connection portion 160a together with the lower gear 140a may be moved upward. The lower gear 140a, the upper gear 150a, and the first power connection portion 160a may be moved upward until the upward movement of the upper gear 150a is limited by the upper housing 170a.

As illustrated in FIG. 19, when the first power connection portion 160a is pulled out, the first power connection portion 160a may protrude in the upper side of the upper housing 170a. When the first power connection portion 160a is pulled out, the first power connection portion 160a may be coupled to the second power connection portion 220 (refer to FIG. 8) provided in the lower surface of the air cleaning module. When the first power connection portion 160a is coupled to the second power connection portion, the first air cleaning module 1 and the second air cleaning module 2 may be electrically coupled to be integrally operated. In addition, as the first power connection portion 160a and the second power connection portion are rotated in the coupled state, the first air cleaning module 1 and the second air cleaning module 2 may be also rotated in the coupled state.

Figure 20:
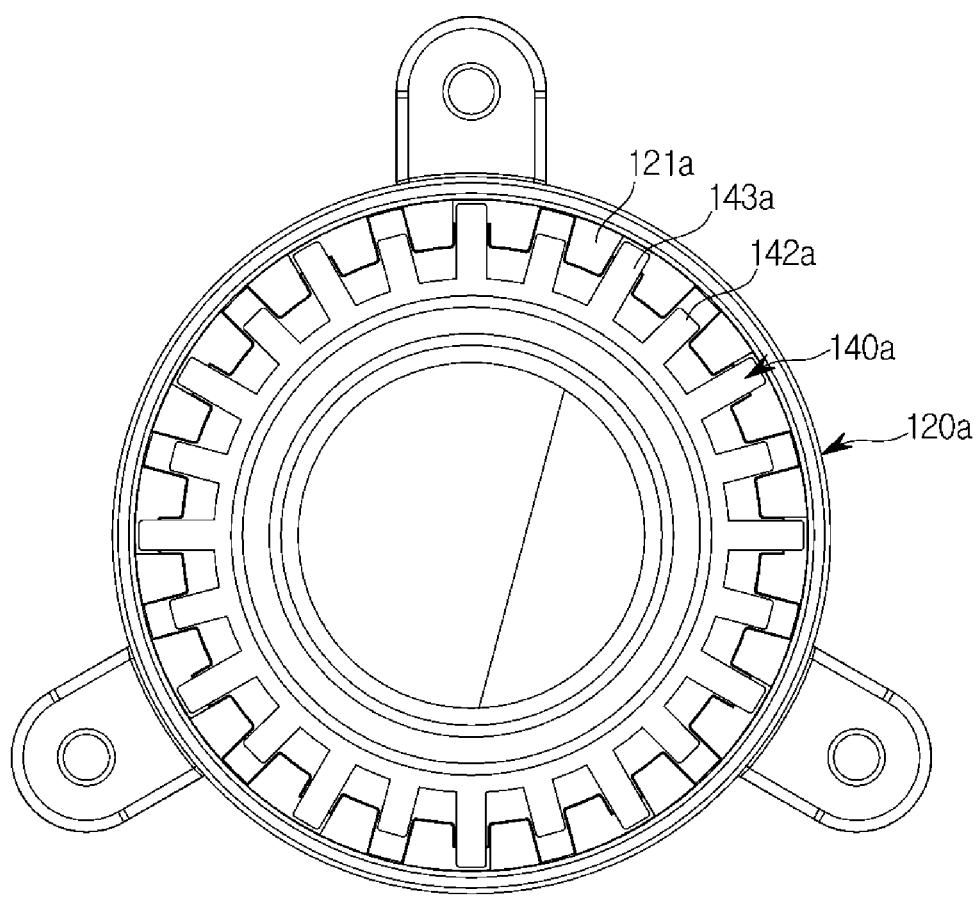
FIG. 20 is a view illustrating a lower surface of a gear housing and a lower housing in a state in which the first connection unit is retracted according to another embodiment.
Figure 21:
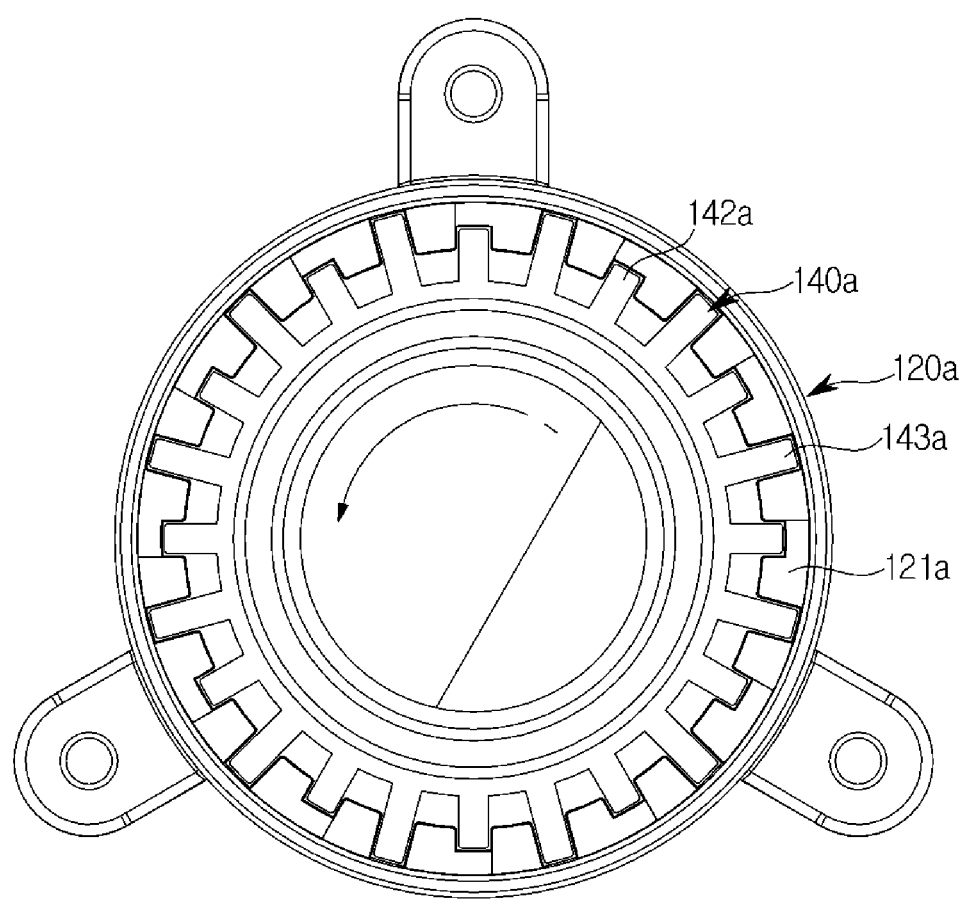
FIG. 21 is a view illustrating the lower surface of the gear housing and the lower housing in a state in which the first connection unit is pulled out according to another embodiment.

FIG. 20 is a view illustrating a lower surface of a gear housing and a lower housing in a state in which the first connection unit is retracted according to another embodiment. FIG. 21 is a view illustrating the lower surface of the gear housing and the lower housing in a state in which the first connection unit is pulled out according to another embodiment.

As illustrated in FIG. 20, when the first connection unit 100a is in the retracted state, the upward movement of the lower gear 140a may be limited by being locked to the gear housing 120a. Particularly, the second protrusion 143a protruding longer than the first protrusion 142a may be locked to the inner gear portion 121a of the lower housing 110a so that the upward movement of the upper gear 150a is limited.

As illustrated in FIG. 21, when the first connection unit 100a is in the pull-out state, the upward movement of the lower gear 140a may be not limited with respect to the gear housing 120a. Particularly, the position of the first protrusion 142a and the second protrusion 143a is changed, the second protrusion 143a may be not locked to the inner gear portion 121a and thus the upward movement of the lower gear 140a may be allowed.

Figure 22:
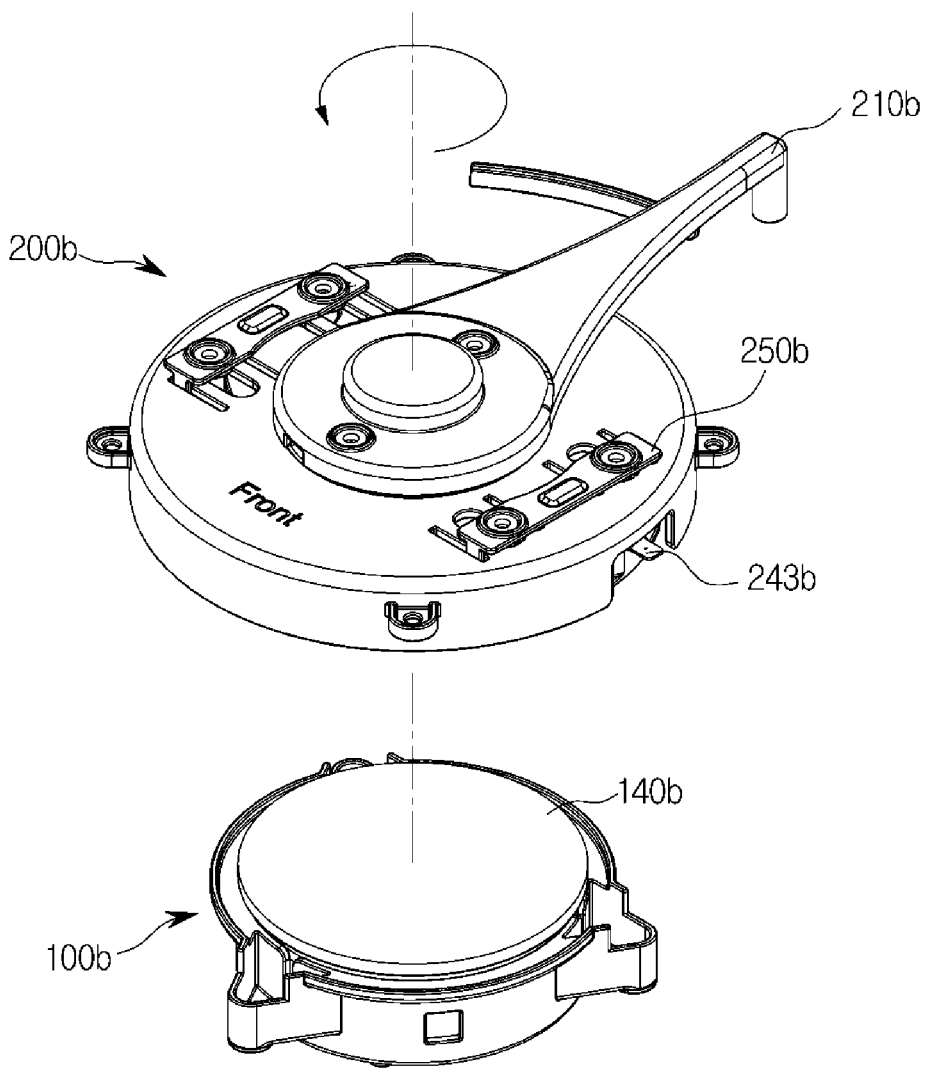
FIG. 22 is a view illustrating a first connection unit and a second connection unit according to another embodiment, particularly a case in which the first connection unit in a retracted state and a lever of the second connection unit is in a separated position.
Figure 23:
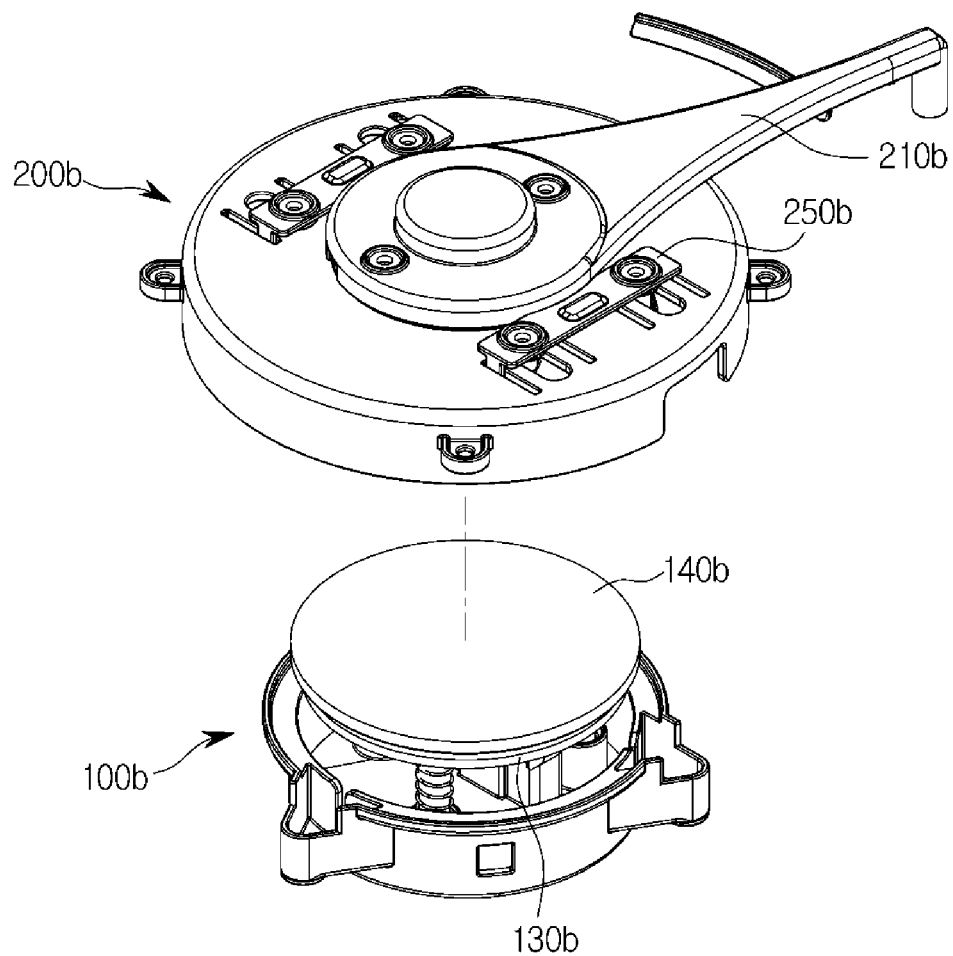
FIG. 23 is a view illustrating the first connection unit and the second connection unit according to another embodiment, particularly a case in which the first connection unit in a pull out state and the lever of the second connection unit is in a coupled position.

FIG. 22 is a view illustrating a first connection unit and a second connection unit according to another embodiment, particularly a case in which the first connection unit in a retracted state and a lever of the second connection unit is in a separated position. FIG. 23 is a view illustrating the first connection unit and the second connection unit according to another embodiment, particularly a case in which the first connection unit in a pull out state and the lever of the second connection unit is in a coupled position.

Hereinafter, according to another embodiment, the first connection unit and the second connection unit will be described in details with reference to drawings.

According to another embodiment, the first connection unit 100b may be provided on an upper surface of an air cleaning module and the second connection unit 200b may be provided on a lower surface of an air cleaning module.

As illustrated in FIG. 22, the first connection unit 100b may be retracted or pulled out, wherein before being coupled to the second connection unit 200b, the first connection unit 100b may be maintained in the retracted state so as not to protrude to the outside of the body 10. When a user applies a force to the first connection unit 100a downward, the first connection unit 100b may be pull out to the upper side, as illustrated in FIG. 23. In this time, the first connection unit 100b may protrude to the outside of the body 10. As mentioned above, the first connection unit 100b may be maintained to protrude to the outside of the body 10 before being coupled to the second connection unit 200b. It is appropriate that the first connection unit 100b is disposed inside of the body 10 before being coupled to the second connection unit 200b by considering the sense of aesthetics.

The second connection unit 200b may include a lever 210b. The lever 210b may be configured to be rotatable, and the lever 210b may be moved between the separated position and the coupled position while rotating. FIG. 22 illustrates the lever 210b is placed in the separated position, and FIG. 23 illustrates the lever 210b is placed in the coupled position.

When the lever 210b is placed in the separated position after the first connection unit 100b and the second connection unit 200b are coupled in the vertical direction, the first connection unit 100b and the second connection unit 200b may be not electrically connected to each other.

When the lever 210b is placed in the coupled position after the first connection unit 100b and the second connection unit 200b are coupled in the vertical direction, the first connection unit 100b and the second connection unit 200b may be electrically connected to each other. That is, a user may pull out the first connection unit 100b, couple the first connection unit 100b to the second connection unit 200b in the vertical direction, and move the lever 210b of the second connection unit 200b to the coupled position, thereby coupling first connection unit 100b to the second connection unit 200b.

Figure 24:
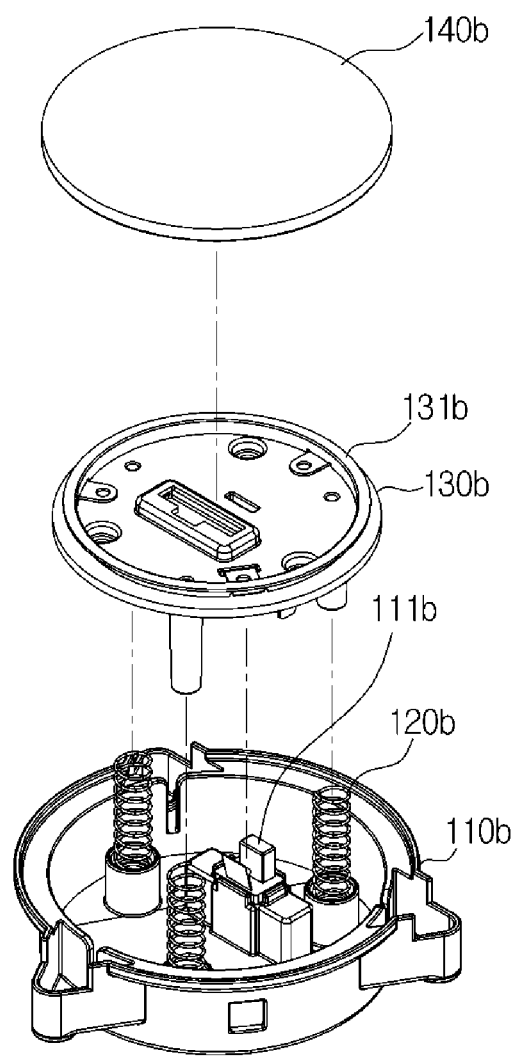
FIG. 24 is an exploded perspective illustrating the first connection unit according to another embodiment.
Figure 25:
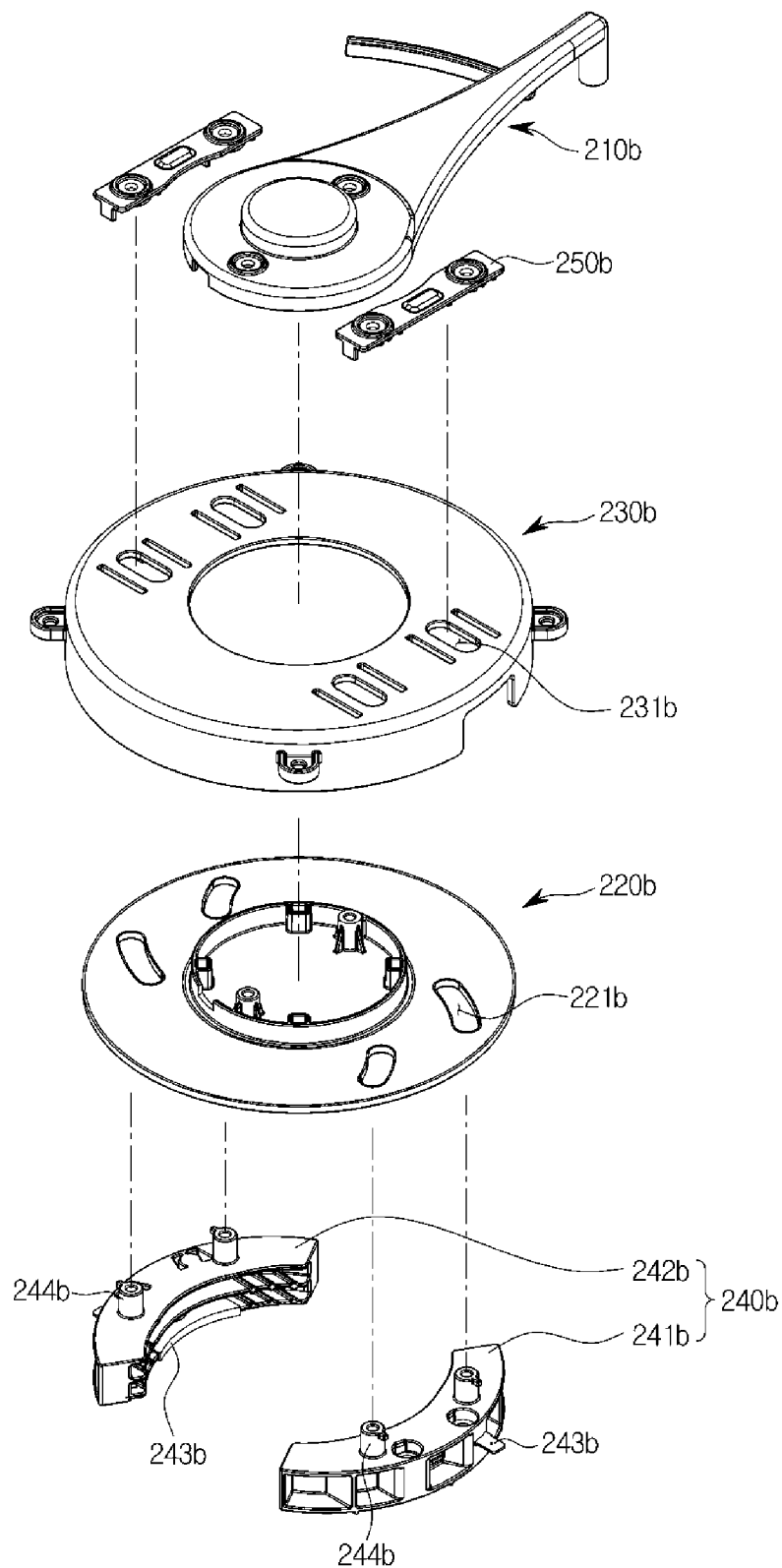
FIG. 25 is an exploded perspective view illustrating the second connection unit according to another embodiment.

FIG. 24 is an exploded perspective illustrating the first connection unit according to another embodiment. FIG. 25 is an exploded perspective view illustrating the second connection unit according to another embodiment.

As illustrated in FIG. 24, according to another embodiment, the first connection unit 100b may include a first case 110b in which a first locking portion 111b is provided, a first power connection portion 130b coupled to the first case 110b to be movable in the vertical direction within a certain range, a cover 140b configured to cover the upper surface of the first power connection portion 130b, and an elastic member 120b configured to provide the elastic force to allow the first power connection portion 130b to move upward.

The first power connection portion 130b may include a second locking portion 132b provided on the lower surface thereof. As the second locking portion 132b is locked to the first locking portion 111b, it may be possible to prevent the first power connection portion 130b from pulling out. That is, when the second locking portion 132b is locked to the first locking portion 111b, the first connection unit 100b may be maintained in the retracted state.

The first power connection portion 130b may include a first power source 131b, wherein the first power source 131b may be formed of a conductive material. When the first power source 131b comes into contact with a second power source 243b described later, the first power source 131b and the second power source 243b may be electrically connected and the first air cleaning module 1 and the second air clean module 2 may be electrically connected.

As illustrated in FIG. 25, the second connection unit 200b may include a lever coupling portion 220b provided with a first guide hole 221b, the lever 210b coupled so as not to be relatively rotated with respect to the lever coupling portion 220b, a second case 230b provided with a second guide hole 231b, and a second power connection portion 240b coupled to the first guide hole 221b and the second guide hole 231b.

The lever coupling portion 220b may be coupled to the lower surface of the second case 230b. The lever coupling portion 220b and the second case 230b may be coupled to each other such that the first guide hole 221b is placed to correspond to the second guide hole 231b. The lever coupling portion 220b and the second case 230b may be coupled to each other to be relatively rotated.

The second power connection portion 240b may be provided to the left and the right in pairs. The second power connection portion 240b may include a guide protrusion 244b coupled to penetrate the first guide hole 221b and the second guide hole 231b. The second power connection portion 240b may include the second power source 243b having the conductivity, wherein when the first connection unit 100b and the second connection unit 200b are coupled to each other, the first power source 131b and the second power source 243b may come into contact with each other to be electrically connected.

The second connection unit 200b may include a protrusion connecting portion 250b configured to prevent a guide protrusion 244b from pulling out from the first guide hole 221b and the second guide hole 231b. The guide protrusion 244b may be provided in plurality, and the protrusion connecting portion 250b may be configured to connect the plurality of guide protrusions 244b.

As illustrated in FIGS. 22 and 23, when the lever 210b is rotated, the guide protrusion 244b of the second power connection portion 240b may be moved along the first guide hole 221b and the second guide hole 231b. Accordingly, the second power connection portion 240b may be moved between the separated position and the coupled position. Although the lever 210b and the lever coupling portion 220b are rotated, the guide protrusion 244b may be linearly moved since the first guide hole 221b formed in spiral shape and the second guide hole 231b formed in a linear shape are overlapped.

The second power connection portion 240b may be arranged in pairs as described above. When the second power connection portion 240b is placed in the separated position, the pair of second power source connection portion 241b and 242b may be relatively far, and when the second power connection portion 240b is placed in the coupled position, the pair of second power source connection portion 241b and 242b may be relatively close.

Figure 26:
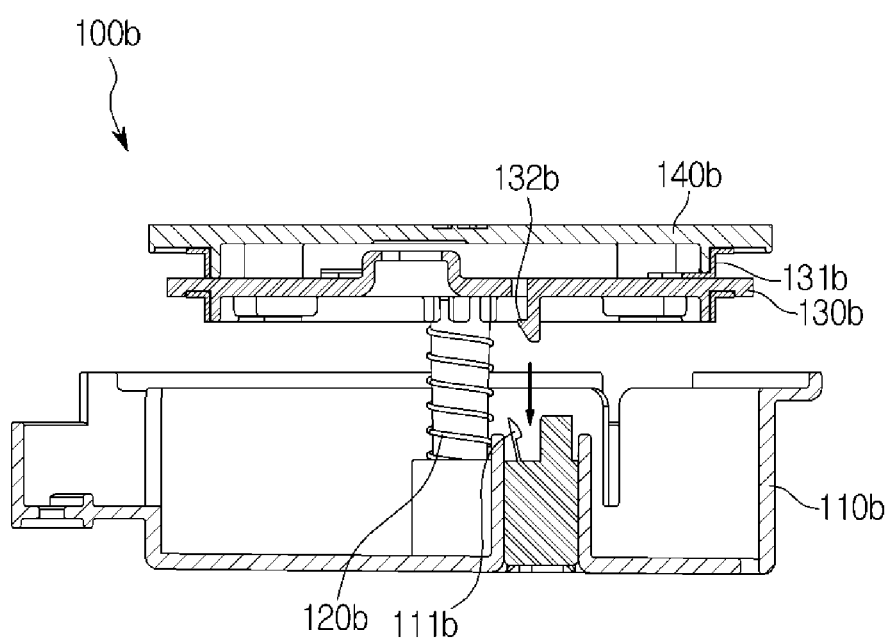
FIG. 26 is a side cross-sectional view illustrating a state in which the first connection unit is in the pulled out state according to another embodiment.
Figure 27:
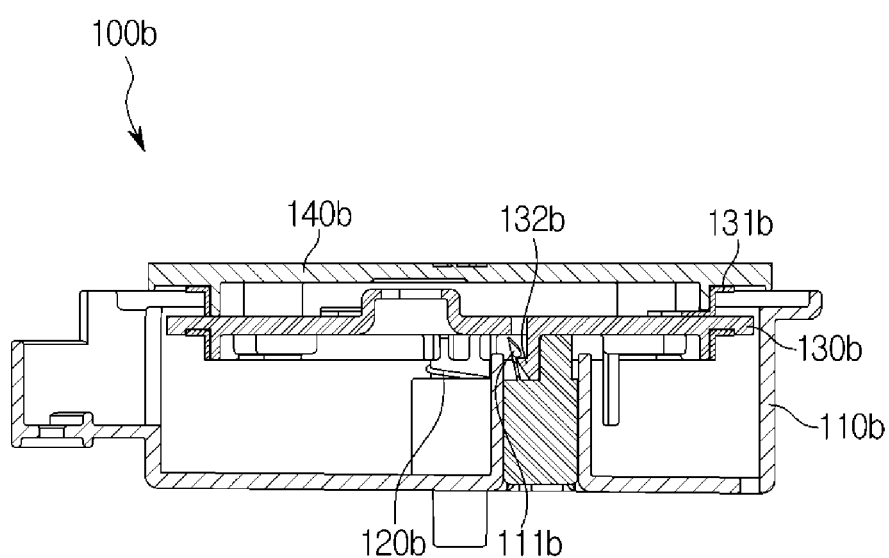
FIG. 27 is a side cross-sectional view illustrating a state in which the first connection unit is retracted state.
Figure 28:
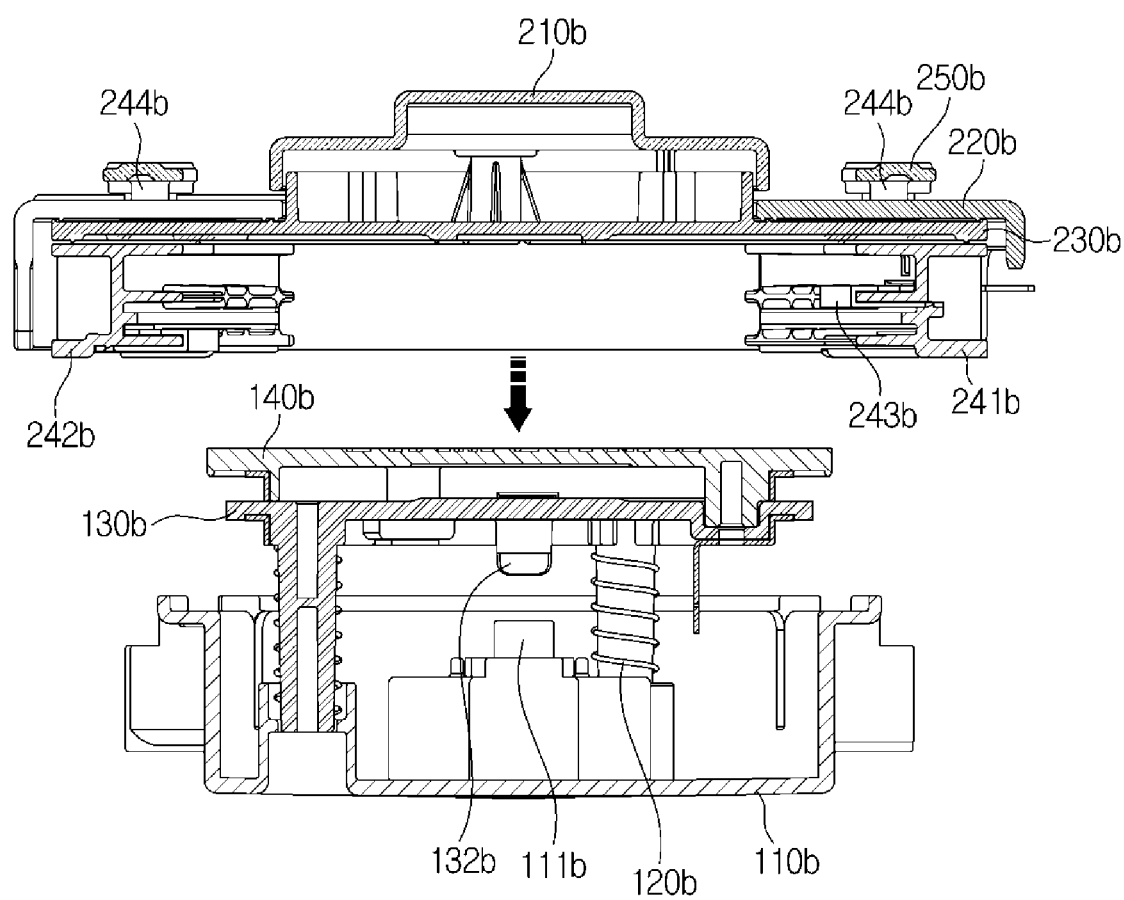
FIG. 28 is a side cross-sectional view illustrating before the first connection unit and the second connection unit are coupled to each other according to another embodiment.
Figure 29:
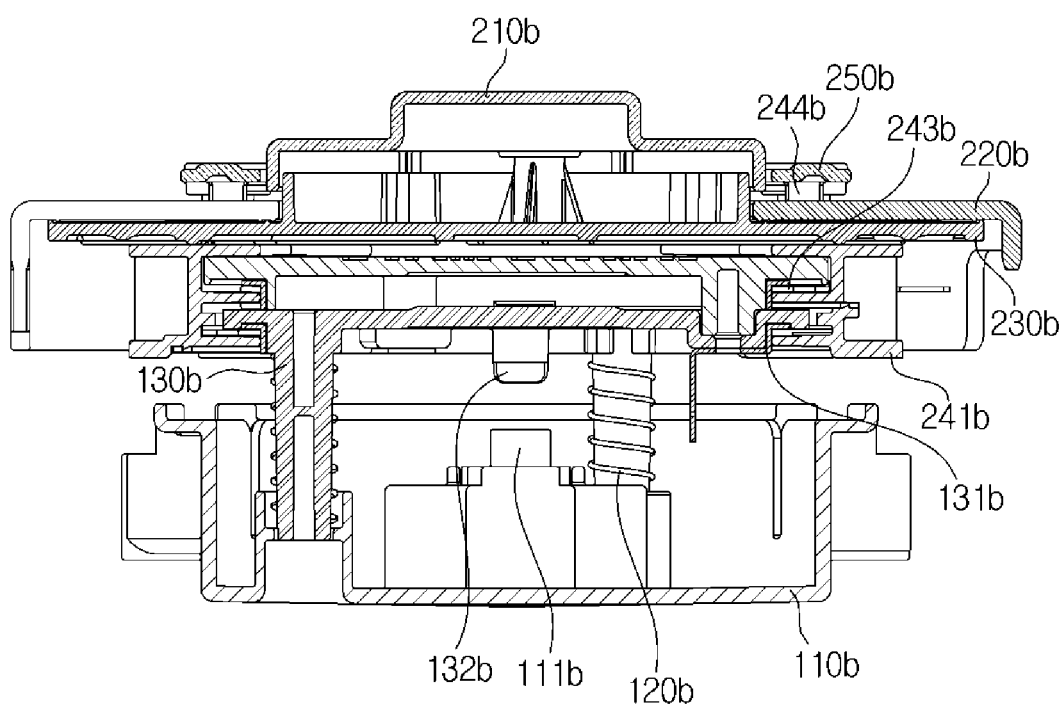
FIG. 29 is a side cross-sectional view illustrating after the first connection unit and the second connection unit are coupled to each other according to another embodiment.

FIG. 26 is a side cross-sectional view illustrating a state in which the first connection unit is in the pulled out state according to another embodiment. FIG. 27 is a side cross-sectional view illustrating a state in which the first connection unit is retracted state. FIG. 28 is a side cross-sectional view illustrating before the first connection unit and the second connection unit are coupled to each other according to another embodiment. FIG. 29 is a side cross-sectional view illustrating after the first connection unit and the second connection unit are coupled to each other according to another embodiment.

As illustrated in FIGS. 26 and 27, when the first locking portion 111b is not locked to the second locking portion 132b, the first connection unit 100b may be pulled out by the elastic force of the elastic member 120b. In contrast, when the first locking portion 111b is locked to the second locking portion 132b, the first connection unit 100b may be retracted since the upward movement of the first power connection portion 130b is limited.

As illustrated in FIGS. 22 and 23, the second connection unit 200b may rotate the lever 210b to adjust a distance with the second power connection portion 240b. When the lever 210b is rotated, the lever coupling portion 220b may be rotated and the second power connection portion 240b, which is coupled to the first guide hole 221b of the lever coupling portion 220b and the second guide hole 231b of the second case 230b, may be moved linearly without the rotary movement.

As illustrated in FIGS. 28 and 29, when the first connection unit 100b is pulled out, the first connection unit 100b and the second connection unit 200b may be coupled to each other. As the first power source 131b comes into contact with the second power source 243b, the first connection unit 100b and the second connection unit 200b may be electrically connected to each other.

As is apparent from the above description, the plurality of air cleaners may be coupled to each other and integrally operated or the plurality of air cleaners may be separated from each other and independently operated.

Since the air cleaner is configured to be coupled or separated and the air cleaner is rotatable in the coupled state, the direction of the outlet and the inlet may be changed.

Since the air cleaner is used in the coupled state or in the separated state, it may be possible to adjust the capacity thereof.

Since the air cleaner is capable of being coupled in a vertical direction to improve space utilization.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air cleaner comprising:
a first air cleaning module provided with a first connection unit; and
a second air cleaning module couplable to the first air cleaning module and provided with a second connection unit;
wherein the second connection unit is configured to be couplable to the first connection unit, and
rotatable with respect to the first connection unit when the second connection unit is coupled to the first connection unit so that the second air cleaning module is rotatable with respect to the first air cleaning module.

2. The air cleaner of claim 1, wherein
the first connection unit configured to be
disposed inside of the first air cleaning module when the first connection unit is separated from the second connection unit, and
protruding out of the first air cleaning module when the first connection unit is coupled to the second connection unit.

3. The air cleaner of claim 1, wherein
the first connection unit is disposed on an upper surface of the first air cleaning module and the second connection unit is disposed on a lower surface of the second air cleaning module.

4. The air cleaner of claim 1, wherein
the first connection unit comprises:
a first housing coupled to the first air cleaning module; and
a first power connection portion disposed inside of the first housing.

5. The air cleaner of claim 4, wherein
the second connection unit comprises:
a second housing provided with a plurality of through holes;
a plurality of balls movably coupled to the plurality of through holes;
a second power connection portion configured to be electrically connectable to the first power connection portion by being couplable to the first power connection portion; and
an elastic member configured to provide an elastic force to the plurality of balls.

6. The air cleaner of claim 5, wherein
the plurality of balls are movable in a range of distance in a radial outward direction of the second housing or in a radial inward direction of the second housing, and
the elastic member provides the elastic force to move the plurality of balls in the radial outward direction.

7. The air cleaner of claim 5, wherein
the second connection unit further comprises:
- an elastic force transmitting member configured to transmit the elastic force from the elastic member to the plurality of balls, the elastic force transmitting member being configured to be movable in a vertical direction; and
- a stopper fixed to an inside of the second housing to limit the downward movement of the elastic force transmitting member.

8. The air cleaner of claim 7, wherein
the elastic force transmitting member is provided in a ring shape, wherein a lower surface of thereof is upwardly inclined toward a radial outer side of the elastic force transmitting member, and
the first housing is formed such that an inner surface thereof is upwardly inclined toward a radial inner side of the first housing.

9. The air cleaner of claim 4, wherein
the first connection unit is rotatable with respect to a rotary shaft, the rotary shaft being disposed in parallel to an upper surface of the first air cleaning module.

10. The air cleaner of claim 1, wherein
the first connection unit comprises:
- a gear housing provided with an inner gear portion, the inner gear portion being provided in an inner circumferential surface of the gear housing;
- an upper gear configured to be movable in a vertical direction by being engaged with the inner gear portion;
- a first power connection portion coupled to an upper portion of the upper gear;
- a lower gear configured to be selectively engaged with the inner gear portion and disposed on a lower side of the upper gear; and
- an elastic member configured to elastically bias the lower gear upward.

11. The air cleaner of claim 10, wherein
the second connection unit comprises a second power connection portion coupled to a lower surface of the second air cleaning module, the second power connection portion being couplable to the first power connection portion, and the second power connection portion being configured to be rotatable when the second power connection portion is coupled to the first power connection portion.

12. The air cleaner of claim 10, wherein
the lower gear is rotatable inside of the gear housing when the lower gear is moved downward by equal to or more than a distance with respect to the gear housing.

13. The air cleaner of claim 12, wherein
the lower gear comprises
- a first protrusion and a second protrusion configured to protrude to a radial outer side of the lower gear,
wherein the second protrusion protrudes greater than the first protrusion, and
the first protrusion and the second protrusion are alternately disposed along the circumferential direction of the lower gear.

14. The air cleaner of claim 13, wherein
when the lower gear is rotated inside of the gear housing, the lower gear is selectively engaged with the inner gear portion,
when the lower gear is engaged with the inner gear portion, the lower gear is moved upward, and
when the lower gear is not engaged with the inner gear portion, the upward movement of the lower gear is limited.

15. The air cleaner of claim 1, wherein
the first connection unit comprises:
- a first case provided with a first locking portion;
- a first power connection portion movably coupled to the first case in a vertical direction, and the first power connection portion being provided with a second locking portion selectively locked to the first locking portion; and
- an elastic member configured to provide an elastic force to move the first power connection portion upward.

16. The air cleaner of claim 15, wherein
the second connection unit comprises:
- a lever coupling portion provided with a first guide hole;
- a lever coupled to the lever coupling portion;
- a second case provided with a second guide hole, the second guide hole and the first guide hole being arranged above and below each other, respectively; and
- a second power connection portion coupled to penetrate the first guide hole and the second guide hole.

17. The air cleaner of claim 16, wherein
when the lever is rotated, the second power connection portion is moved back and forth, and
as the second power connection portion is moved back and forth, the second power connection portion is selectively connected or disconnected to the first power connection portion.

18. The air cleaner of claim 17, wherein
the second power connection portion is provided in pairs,
wherein as the pair of the second power connection portions move back and forth, a distance between the pair of the second power connection portions is increased or reduced.

19. The air cleaner of claim 15, wherein
when a force greater than the elastic force of the elastic member is applied to the first power connection portion in a downward direction, the first power connection portion is retracted into an inside of the first air cleaning module or pulled out from the inside of the first air cleaning module.

* * * * *